US011438892B2

(12) United States Patent
Hou et al.

(10) Patent No.: US 11,438,892 B2
(45) Date of Patent: Sep. 6, 2022

(54) METHOD AND ELECTRONIC APPARATUS FOR WIRELESS COMMUNICATION, STORAGE MEDIUM

(71) Applicant: Sony Corporation, Tokyo (JP)

(72) Inventors: Yanzhao Hou, Beijing (CN); Xiaofeng Tao, Beijing (CN); Yuming Liu, Beijing (CN); Zhaoqi Peng, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 247 days.

(21) Appl. No.: 16/628,682

(22) PCT Filed: Aug. 3, 2018

(86) PCT No.: PCT/CN2018/098407
§ 371 (c)(1),
(2) Date: Jan. 6, 2020

(87) PCT Pub. No.: WO2019/029435
PCT Pub. Date: Feb. 14, 2019

(65) Prior Publication Data
US 2020/0187208 A1 Jun. 11, 2020

(30) Foreign Application Priority Data

Aug. 10, 2017 (CN) .......................... 201710680258.4

(51) Int. Cl.
*H04L 5/00* (2006.01)
*H04W 72/08* (2009.01)
*H04W 72/04* (2009.01)

(52) U.S. Cl.
CPC ......... *H04W 72/0453* (2013.01); *H04L 5/001* (2013.01); *H04L 5/0058* (2013.01); *H04W 72/048* (2013.01); *H04W 72/08* (2013.01)

(58) Field of Classification Search
CPC ........ H04L 5/00; H04W 72/08; H04W 72/048
(Continued)

(56) References Cited

U.S. PATENT DOCUMENTS

| 2005/0088978 A1* | 4/2005 | Zhang | ..................... H04L 45/02 370/254 |
| 2016/0249307 A1 | 8/2016 | Thangarasa et al. | |
| 2016/0381720 A1* | 12/2016 | Baek | ....................... H04W 8/14 370/329 |

FOREIGN PATENT DOCUMENTS

| CN | 105246163 A | 1/2016 |
| CN | 106256160 A | 12/2016 |

(Continued)

OTHER PUBLICATIONS

International Search Report and Written Opinion dated Oct. 18, 2018 for PCT/CN2018/098407 filed on Aug. 3, 2018, 9 pages including English Translation of the International Search Report.

*Primary Examiner* — Angel T Brockman
(74) *Attorney, Agent, or Firm* — Xsensus LLP

(57) ABSTRACT

The present disclosure provides a method and electronic apparatus for wireless communication and a computer readable storage medium. The electronic apparatus comprises a processing circuit. The electronic apparatus is configured to determine whether a related parameter of an available component carrier in a sidelink satisfies a preset condition; and if the related parameter satisfies a present condition, to configure the available parameter for use as a secondary component carrier in carrier aggregation of the sidelink.

19 Claims, 13 Drawing Sheets

(58) Field of Classification Search
USPC .......................................................... 370/329
See application file for complete search history.

(56) References Cited

FOREIGN PATENT DOCUMENTS

| | | |
|---|---|---|
| CN | 106549743 A | 3/2017 |
| RU | 2 588 583 C2 | 10/2016 |
| WO | 2017/003161 A1 | 1/2017 |

\* cited by examiner

Traveling direction

METHOD AND ELECTRONIC APPARATUS FOR WIRELESS COMMUNICATION, STORAGE MEDIUM

CROSS-REFERENCE TO RELATED APPLICATIONS

The present application is based on PCT filing PCT/CN2018/098407, filed Aug. 3, 2018, which claims the priority to Chinese Patent Application No. 201710680258.4, filed Aug. 10, 2017 with the China National Intellectual Property Administration, the entire contents of each are incorporated herein by reference.

FIELD

Embodiments of the present disclosure generally relate to the field of wireless communications, in particular to carrier aggregation (CA) technologies, and more particularly to an electronic apparatus and a method for wireless communications, and a computer-readable storage medium.

BACKGROUND

In the carrier aggregation, two or more component carriers (CCs) are aggregated to support a wider transmission bandwidth. A network node such as user equipment (UE) may perform reception or transmission on one or more component carriers simultaneously. The aggregated component carriers may be continuous or discontinuous in the frequency domain. The aggregated component carriers include a primary component carrier (PCC, which is hereinafter also referred to as a primary carrier) and a secondary component carrier (SCC, which is hereinafter also referred to as a secondary carrier). The PCC may be used, for example, establishment and re-establishment of an initial link. The SCC may be used to provide additional radio resources and may be configured and activated.

On the other hand, a sidelink is a link for direct communication between network nodes, such as D2D communication or V2V communication. The communication via the sidelink may not involve a network control node. In some cases, a network node performing communications via the sidelink may be outside of the coverage of the network control node, so that the network node cannot reliably receive instructions from the network control node. In this case, these network nodes are in an autonomous communication state.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: determine whether a relevant parameter of an available component carrier in a sidelink meets a predetermined condition; and in a case of the relevant parameter meeting the predetermined condition, configure the available component carrier to be a secondary carrier for carrier aggregation in the sidelink.

According to another aspect of the present disclosure, a method for wireless communications is provided. The method includes: determining whether a relevant parameter of an available component carrier in a sidelink meets a predetermined condition; and in a case of the relevant parameter meeting the predetermined condition, configuring the available component carrier to be a secondary carrier for carrier aggregation in the sidelink.

With the electronic apparatus and the method for wireless communications provided in the present disclosure, a configuration of a secondary carrier for carrier aggregation in a sidelink can be implemented, providing a flexible implementation of carrier aggregation in the sidelink.

According to other aspects of the present disclosure, there are further provided computer program codes and computer program products for implementing the methods above, and a computer-readable storage medium having recorded thereon the computer program codes for implementing the methods described above.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure.

In the accompanying drawings.

DETAILED DESCRIPTION OF EMBODIMENTS

Figure 1:
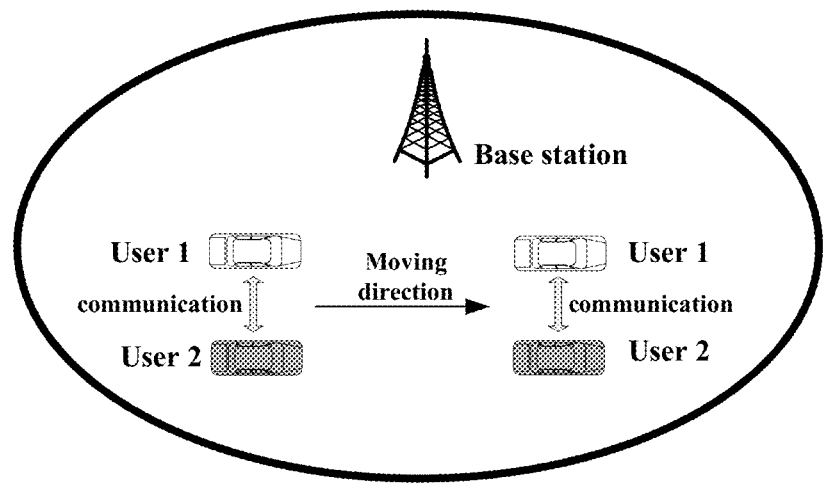
FIG. 1 shows an example of a V2V communication scenario as a sidelink scenario.

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Existing carrier aggregation solutions are all based on a manner in which a network control node such as a base station (in an LTE system, for example, an eNB) participates in scheduling. That is, the base station performs scheduling on various behaviors for carrier aggregation such as relevant measurements, decisions, and event triggering. This carrier aggregation mode is hereinafter referred to as a base station scheduling mode. Moreover, the current carrier aggregation communication is mainly applied to a link between a network control terminal and a network node, such as a Uulink scenario.

However, as mentioned above, in the sidelink scenario where a network node communicates directly with another network node, the communication between the network nodes may not involve a network control node. Therefore, in the case of using carrier aggregation for communication, various behaviors of the existing carrier aggregation may not be performed correctly. In view of this, a solution for carrier aggregation in a sidelink is proposed in the present embodiment. The carrier aggregation mode in which no base station participates is hereinafter referred to as a user autonomous selection mode.

In the present disclosure, the network control node may be an entity in a communication system for implementing functions such as setting, control, and communication resource allocation for the communication activities, for example, a base station (for example, an eNB or a gNB) in a cellular communication system, and a baseband cloud device under a Cloud-RAN/Centralized-RAN (C-RAN) architecture (in which a cell may not exist), such as any BBUs that are in high speed communication with each other in a BBU pool under the C-RAN architecture. The network node may be an entity that performs communication by using communication resources in a communication system, for example, various users or user equipment (such as mobile terminals, smart vehicles, and smart wearable devices having cellular communication capability) or network infrastructures such as a small cell base station.

Figure 2:
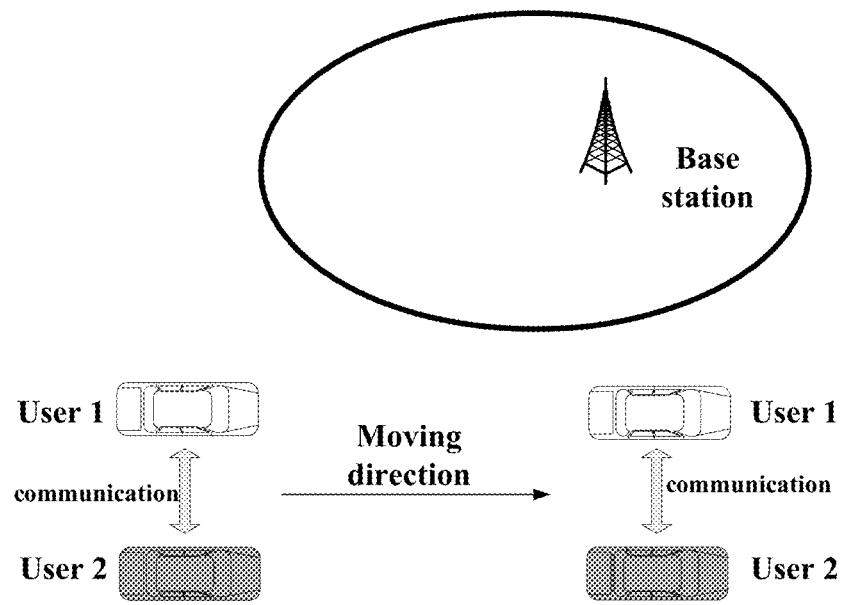
FIG. 2 shows another example of a V2V communication scenario as a sidelink scenario.

For ease of understanding, FIGS. 1 and 2 show examples of a V2V communication scenario as a sidelink scenario, where a base station serves as a network control node, and a user (or a corresponding vehicle, which may also be referred to as a UE) serves as a network node. FIG. 1 shows a situation (In-coverage, IC) where the user is within the coverage range of the base station, and FIG. 2 shows a situation (Out-of-coverage (OOC) where the user is outside of the coverage range of the base station. In the following, this sidelink scenario will be mainly described, but it should be understood that, this is not limitative and is only for convenience of description, and the technical solutions of the present disclosure may be suitably applied to other sidelink scenarios.

Figure 3:
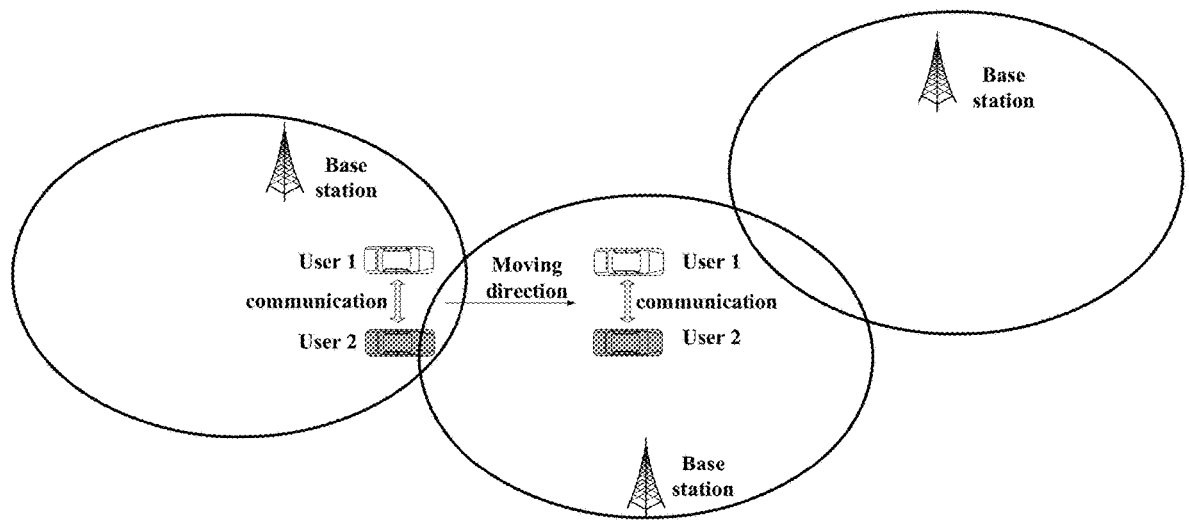
FIG. 3 is a schematic diagram showing that a user is frequently switched between different carrier coverage ranges.

When carrier aggregation is performed in the OOC scenario, the scheduling based on the base station cannot be performed. Moreover, due to the mobility of the user, the user may frequently switch between different carrier coverage ranges, resulting in instability during the carrier aggregation, as shown in FIG. 3. Further, switching between the OOC situation and the IC situation may occur. In addition, diversity and differentiation of a secondary carrier and limitation of a measurement basis may affect accuracy of configuration for the secondary carrier, further affecting reliability of the carrier aggregation communication. An electronic apparatus for wireless communications is provided in the present disclosure, to solve or alleviate one or more of these problems, which is not limited thereto.

Figure 4:
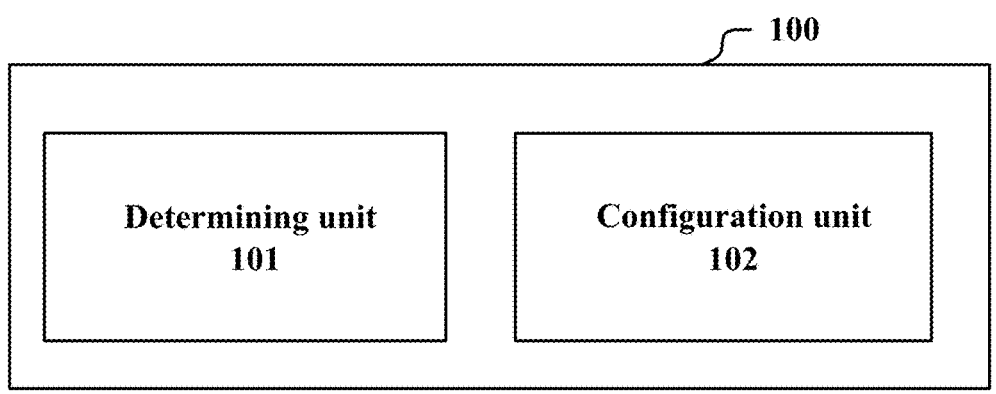
FIG. 4 shows a block diagram of functional modules of an electronic apparatus for wireless communications according to an embodiment of the present disclosure.

FIG. 4 shows a block diagram of functional modules of an electronic apparatus 100 for wireless communications according to an embodiment of the present disclosure. As shown in FIG. 4, the electronic apparatus 100 includes a determining unit 101 and a configuration unit 102. The determining unit 101 is configured to determine whether a relevant parameter of an available component carrier in a sidelink meets a predetermined condition. The configuration unit 102 is configured to: in a case of the relevant parameter meeting the predetermined condition, configure the available component carrier to be a secondary carrier for carrier aggregation in the sidelink.

The determining unit 101 and the configuration unit 102 may be implemented by one or more processing circuits, which may be implemented, for example, as a chip.

The electronic apparatus 100 determines, based on whether the relevant parameter of an available component carrier in a sidelink meets a predetermined condition, whether to configure the available component carrier to be a secondary carrier. In this way, the electronic apparatus 100 can perform configuration of the secondary carrier for carrier aggregation in the sidelink. The electronic apparatus 100 may be located on the network node side, or on the network control node side. The case that the electronic apparatus 100 is located on the network node side will be described in this embodiment.

Specifically, in the case that the electronic apparatus 100 is located on the network node side, the configuration of the SCC is performed by the network node, requiring no involvement of a network control node, which is particularly applicable to the OOC scenario. However, it is not limited, and may also be applicable to the IC scenario.

Before the configuration of the secondary carrier is performed, the determination of the primary carrier is required to be performed. In the IC scenario, a primary carrier for carrier aggregation may be selected by a network control node such as a base station. In such an example, the network control node transmits a measurement event to the network node, and the network node measures relevant parameters of the available CCs and reports the relevant parameters of the available CCs to the network control node. The network control node selects the PCC based on the reported measurement results, and configures the PCC for the network node.

Figure 5:
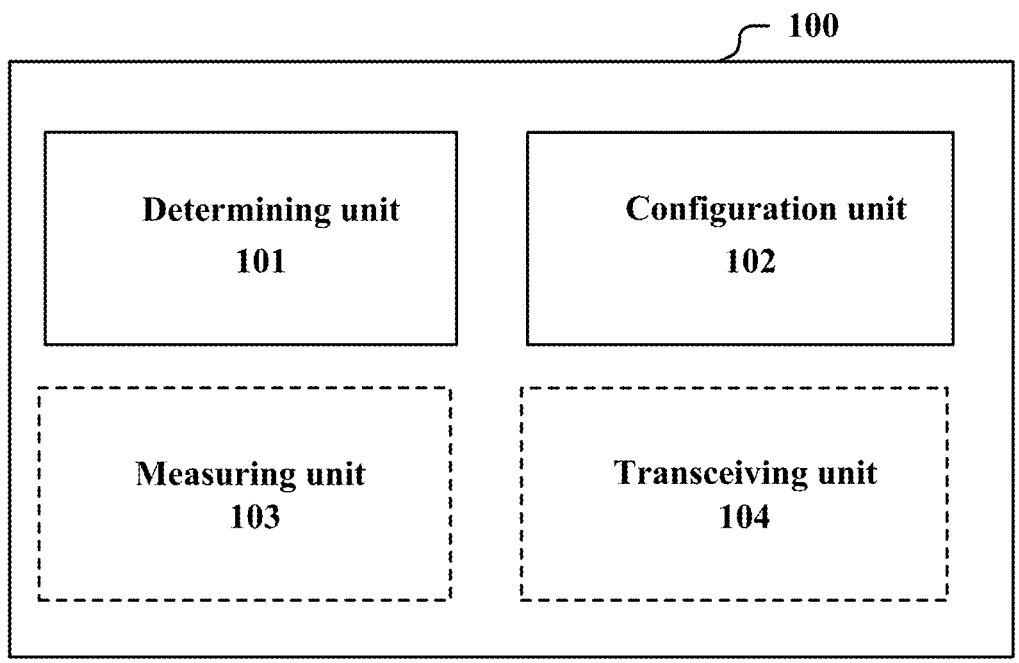
FIG. 5 shows a block diagram of functional modules of an electronic apparatus for wireless communications according to an embodiment of the present disclosure.

Exemplarily, as shown in FIG. 5, the electronic apparatus 100 may further include: a measuring unit 103 and a transceiving unit 104. The measuring unit 103 is configured to measure the relevant parameters of the available component carriers. The transceiving unit 104 is configured to provide measurement results to a network control node, and acquire, from the network control node, information of the primary carrier selected by the network control node based on the measurement results. The measuring unit 103 and the transceiving unit 104 may be implemented by one or more processing circuits, which may be implemented, for example, as a chip. A portion of the transceiving unit 104 may also be implemented as a communication interface or an antenna.

Here, in a case that the primary carrier and the secondary carrier share a resource pool, the available component carriers may be respective component carriers in the resource pool. In a case that the resource pools for the primary carrier and the secondary carrier are separately set, the available component carriers are component carriers in the resource pool for the primary carrier.

Specifically, the measuring unit 103 may measure a parameter of communication quality of each component carrier. The parameter of the communication quality includes, for example, information of signal strength on the corresponding CC, such as Receiving Signal Reference Power (RSRP) or Receiving Signal Strength Indication (RSSI), Channel Quality Indicator (CQI), Signal to Interference Ratio (SIR), Channel Busy Ratio (CBR) or the like. The network control node may select, for example, a CC with the best communication quality as the PCC.

In addition, the transceiving unit 104 may further provide basic information and load measurement results of the network node to the network control node, so that the network control node determines whether to perform the carrier aggregation. The basic information is provided before the determination of the primary carrier is performed. In other words, two parties of the sidelink communication provide basic information to the network control node, so that the network control node preliminarily determines the feasibility and necessity of implementing the carrier aggregation.

For example, the basic information may include one or more of the following: a type of the network node such as whether the network node is an R14 user or an R15 user, a moving speed of the network node, a geographical location of the network node, capability of the network node such as whether capable of supporting carrier aggregation or information processing capability, transceiving link status of the network node, and transceiving link occupation status. In addition, the basic information may further include an overview of a load of the network node, such as whether the load pressure is large enough, whether the requirement for transmission rate is high enough, or the like. If it is determined that both the communication parties can perform carrier aggregation and at least one party needs to perform carrier aggregation, the network control node determines that carrier aggregation is to be performed and enters a preparation phase. In the preparation phase, the network control node performs the PCC selection as described above.

Figure 6:
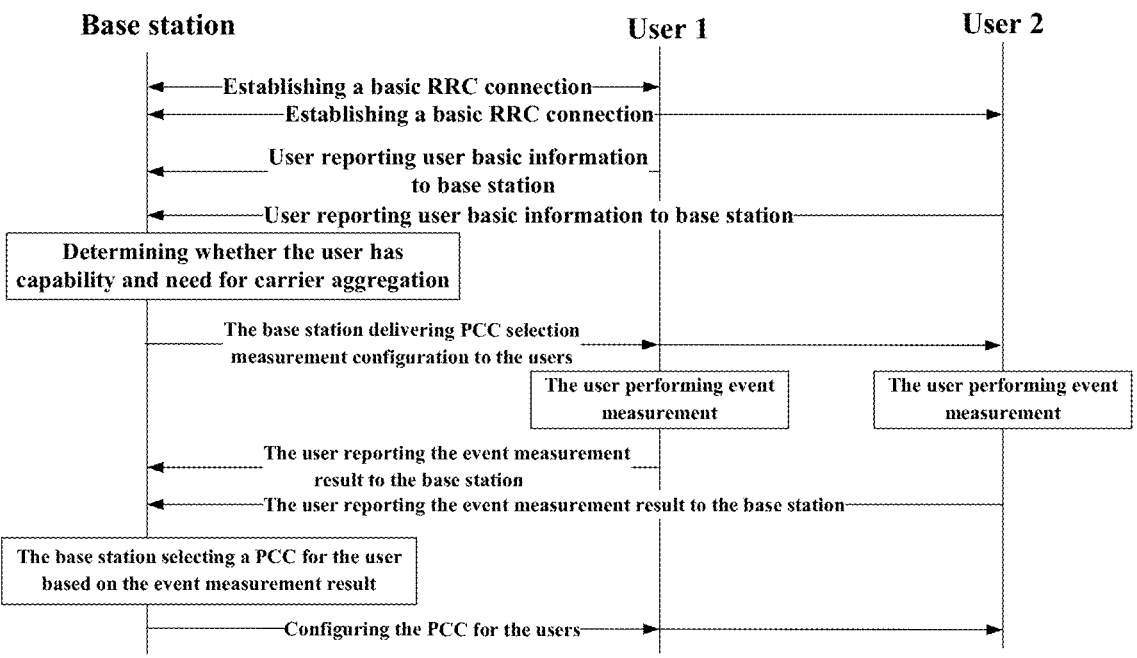
FIG. 6 is a schematic diagram showing an information procedure between a base station and a user in an example in which PCC selection is performed by a base station in the scenario shown in FIG. 1.

For ease of understanding, FIG. 6 shows a schematic diagram of an information procedure between a base station and a user for which carrier aggregation is to be performed in an example in which PCC selection is performed by the base station in the scenario shown in FIG. 1. Firstly, the base station establishes a basic Radio Resource Control (RRC) connection with a user 1 and a user 2. Then, the user 1 and the user 2 respectively report user basic information thereof to the base station, and the base station determines, based on the information, whether each of the users has capability and need for carrier aggregation. If it is determined that there is capability and need for carrier aggregation, the base station delivers a PCC selection measurement configuration to the users, and the user 1 and the user 2 respectively perform measurement, for example, measurement on the communication quality of the CC, and report the measurement results to the base station. It should be understood that measurement operations such as measurement on the communication quality of the CC may also be performed by the base station without requiring measurement and reporting by the user. Subsequently, the base station selects the PCC for the user 1 and the user 2 based on the event measurement result, and configures the PCC for the user 1 and the user 2. It should be understood that the base station may configure the same PCC or different PCCs for the user 1 and the user 2. That is, the PCC may be symmetric or asymmetric for the communication parties, and it depends on, for example, the resource pools used by the two parties and current resource usage status.

The example in which the PCC configuration is performed by a network control node is described above. In other examples, a primary carrier for carrier aggregation in the sidelink may be determined by a network node, particularly by the configuration unit 102 of the electronic apparatus 100, based on the relevant parameters of the respective available component carriers.

In this example, the electronic apparatus 100 is used, for example, for a first network node on one side of the sidelink, and the configuration unit 102 cooperates with a second network node on the other side of the sidelink to perform the carrier aggregation. It should be understood that the first network node and the second network node are named only for ease of distinction, without representing any sense of order or any other meaning, and the two are equivalent. The following description is given by taking a case that relevant decision operations are performed by the first network node as an example, which is not limitative.

A basic sidelink connection has been established between the first network node and the second network node. Through the sidelink connection, the transceiving unit 103 may share the basic information of respective network nodes between the first network node and the second network node, that is, the transceiving unit 103 transmits the basic information of the first network node to the second network node and receives the basic information of the second network node. The content about the basic information has been given hereinbefore and is not repeated herein. The configuration unit 102 determines, at least based on the basic information, whether to perform the carrier aggregation, for example, determines, based on the basic information, whether each of the first network node and the second network node has the capability and the need for the carrier aggregation. If it is determined that both the first network node and the second network node have the capability for the carrier aggregation and one of the first network node and the second network node has the need for the carrier aggregation, the configuration unit 102 determines that carrier aggregation is to be performed and enters a preparation phase of the carrier aggregation.

In this example, since the carrier aggregation operation is performed autonomously by the network node, without no involvement of a network control node, it is necessary to select one of the two network nodes to perform necessary decision operations. As an example, the configuration unit 102 determines, based on the shared basic information of the network nodes, that relevant decision operations in the carrier aggregation are to be performed by the first network node, and cooperates with the second network node to achieve agreement. Specifically, the configuration unit 102 may compare the basic information of the first network node with the basic information of the second network node, for example, compare the information processing capability, the load status and the like of the two network nodes, and select a network node with stronger processing capability and a lighter load as the network node for performing decision (including triggering) operations. The first network node serving as the decision network node is taken as an example herein. After respective selection of the decision node is performed, the first network node and the second network node may interchange with each other the respective selection results, and confer with each other to achieve agreement. In this process, the first network node and the second network node perform signaling interaction.

After the first network node is selected to perform the relevant decision operations for the carrier aggregation, the configuration unit 102 of the first network node configures the PCC. For example, the first network node and the second network node respectively perform autonomous measurement on the relevant parameter of the available CCs, such as the parameter of the communication quality, and the second network node reports the measurement result to the first network node. The configuration unit 102 of the first network node selects the PCC based on the measurement result of the first network node and the measurement result reported by the second network node, for example, may select the CC with the best communication quality as the PCC. Similarly, the parameter of the communication quality includes, for example, signal strength information on the corresponding CC such as RSRP or RSSI, CQI, SIR, CBR, or the like.

If the selected CC is the same as the CC used for the basic sidelink communication, the CC used for the basic sidelink communication is configured to be the PCC; otherwise the selected CC is configured to be the PCC, and the basic sidelink communication is performed on the PCC. Considering factors such as actual channel status, a communication mode (such as TDD/FDD) and the like, the PCC selected for the first network node and the second network node may be symmetric or asymmetric, that is, more than one PCC may be used in the sidelink carrier aggregation communication.

Figure 7:
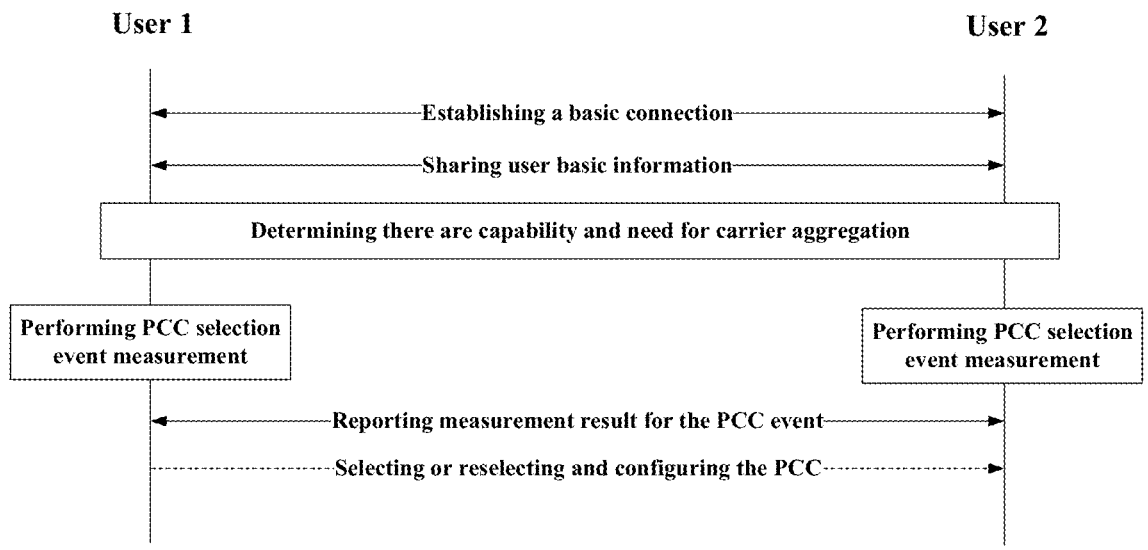
FIG. 7 is a schematic diagram showing an information procedure between users in an example in which PCC selection is performed by a user in the scenario shown in FIG. 1 or FIG. 2.

For ease of understanding, FIG. 7 shows a schematic diagram of an information procedure between users in an example in which PCC selection is performed by a user in the scenario shown in FIG. 1 or FIG. 2. Firstly, a basic sidelink connection is established between a user 1 and a user 2, and the basic information of the user 1 and the user 2 is shared through the basic connection. Next, the user 1 and the user 2 respectively determine whether to perform carrier aggregation and confer with each other. For example, both of the user 1 and the user 2 decide that, the carrier aggregation is to be performed and relevant decision operations are to be performed by the user 1. Subsequently, the user 1 and the user 2 perform measurements of PCC selection event, for example, measure the parameter of the communication quality of the available CCs. The user 2 reports the measurement result to the user 1, and the user 1 performs selection or reselection of the PCC based on the measurement result reported by the user 2 and the measurement result of the user 1, and notifies the user 2.

In addition, in the above two PCC determination manners, the configuration of the PCC may be variable, that is, the reselection of the PCC may be performed. The first network node and the second network node may periodically measure the carriers in the resource pool. If the current PCC communication quality does not reach a threshold and the communication quality of other available carriers in the resource pool is better, for example, with a smaller RSRP value which indicates that there is more space for the network node to use, the network control node or the configuration unit 102 of the first network node may trigger a PCC switching event.

In addition, in order to reduce the load of the network node due to measurement and selection, a primary carrier selection range may be pre-configured. When configuring the primary carrier, only CCs in the pre-configured range are measured and selected.

After the configuration of the PCC is completed in one of the above manners, the configuration and activation of the SCC are performed autonomously by the network node. In the case that the PCC is configured by the network control node, the first network node and the second network node firstly perform the conference and determination of the decision network node as described above. That is, the first network node and the second network node share basic information with each other and confer to determine a network node serving as the decision network node based on the information. In the case that the PCC is configured by the network node, since the decision network node has been selected, the following SCC configuration operations may be directly performed. Alternatively, the decision network node may be changeable. The first network node and the second network node may perform selection of the decision network node based on basic information and current real-time status, for example, before each decision operation is performed, or when a particular event occurs, or periodically. For convenience of description, no matter whether the decision network node is changeable, the first network node is taken as an example of the decision network node. However, it should be understood that, this is not limiting, and change of the decision network node does not affect the implementation of embodiments of the present disclosure.

For example, the configuration unit 102 configures, based on the shared basic information of the network nodes, measurement operations to be performed on the available component carriers by the first network node and the second network node, and the transceiving unit 104 acquires relevant parameters of the available component carriers measured by respective network nodes.

In a case that the primary carrier and the secondary carrier share a resource pool, the available component carrier may be a component carrier other than the primary carrier in the resource pool. For example, in a case that the network control node configures the PCC, component carriers that have been configured, such as a component carrier that has been selected as the PCC and a component carrier that is configured as the SCC, may be marked to avoid collision. On the other hand, in a case that the resource pools for the primary carrier and the secondary carrier are separately set, the available component carrier is a component carrier in the resource pool for the secondary carrier.

The configuration unit 102 configures one of the following CC measurement manners, for example, based on the shared basic information: one of the first network node and the second network node performs all measurements; the first network node and the second network node respectively perform the measurement thereof; and a proportion of available CCs to be measured by the first network node and the second network node is determined based on the basic information.

For example, the measuring units of the first network node and the second network node periodically measure a certain proportion of available CCs determined based on the basic information to acquire the relevant parameters of the available CCs, and the transceiving unit 104 of the first network node acquires the measurement results from the second network node. In an example, the measurement results of the second network node are provided to the transceiving unit 104 only when a predetermined event triggering condition is met. A period of the measurement is, for example, configured by high layer signaling or pre-configured.

Generally, a CC with better communication quality and better stability is preferentially selected and configured as the SCC. In an example, the relevant parameter of an available CC includes a parameter indicating communication quality of the corresponding available CC. That is, the network node measures the communication quality of its available CCs. For example, the parameter indicating the communication quality of the corresponding available CC includes information of signal strength on the corresponding CC, where the signal strength information indicates status that the corresponding CC is occupied. The larger signal strength indicates the higher occupation degree of the corresponding component carrier, indicating that the corresponding component carrier is less suitable to be configured as the SCC. Therefore, the predetermined condition may be set as the signal strength on the corresponding CC being lower than a predetermined threshold, that is, the component carrier that is relatively idle is selected and configured as the SCC. For example, the communication quality of the CC may be measured by measuring an adjacent carrier offset, a particular offset of an adjacent carrier frequency, a particular offset of an adjacent carrier, and the like.

In another example, the relevant parameter of the available CC may further include a parameter indicating the load status. In practice, the load status also affects the signal strength information to a certain extent, and the load status together with the signal strength information is used to evaluate the communication quality of the CC.

In addition, as mentioned above, in the sidelink scenario, the network node performing communication may be in a high-speed moving state, resulting in the network node frequently switching between different carrier coverages, further resulting in instability of the carrier aggregation implementation process. Therefore, the relevant parameter of the available CC may also set to further include a parameter indicating stability of the corresponding available component carrier, to ensure the stability of the carrier aggregation process.

Exemplarily, the parameter indicating the stability of the corresponding available CC includes an estimated time duration when carrier aggregation communication can be performed with the corresponding available component carrier at communication quality meeting a requirement. The communication quality requirement is, for example, determined by a communication quality threshold configured by the high level protocol, or pre-configured.

The estimated time duration is obtained, for example, based on a current channel condition. For example, the estimated time duration may be determined based on at least one of the following: a moving speed, a geographical location and a transceiving link occupation ratio of a network node, a carrier coverage range and carrier signal strength of the available CC. The determining process is an estimation process. The estimated time duration can be compared with the stability threshold, and the comparison result is used as a condition for determining whether the CC can be configured as the SCC. For example, the CC can be configured as the SCC when both the communication quality and the stability of the CC meet the conditions. The stability threshold may be configured by the base station, pre-specified, or specified by the user.

Furthermore, if the CC previously configured as the SCC no longer meets the predetermined condition, the configuration unit 102 deletes the SCC configuration of the CC if the CC is not aggregated.

Figure 8:
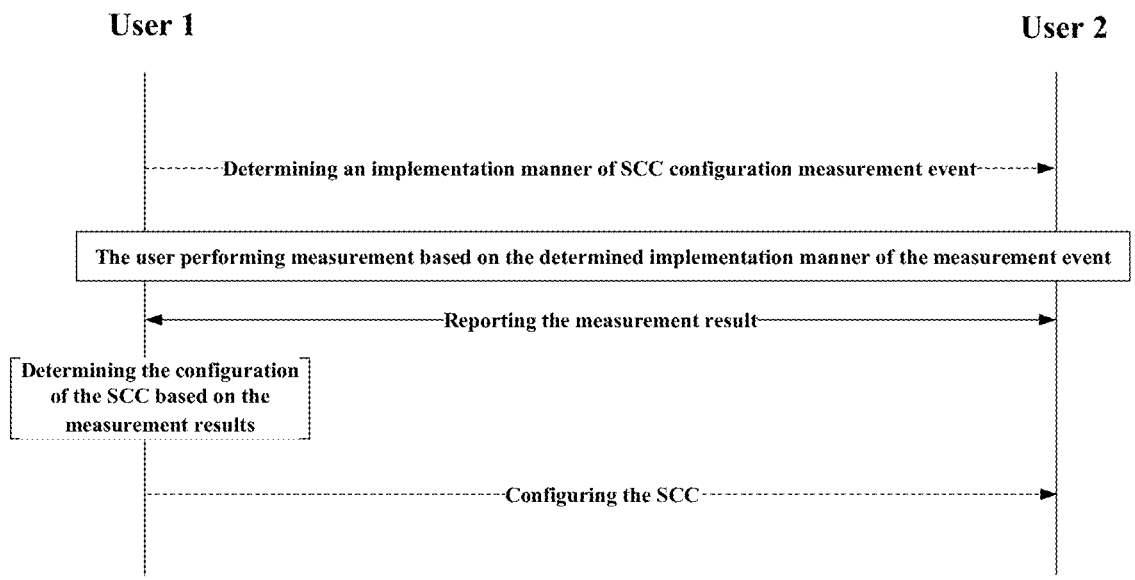
FIG. 8 is a schematic diagram showing an information procedure between users in an example in which SCC configuration is performed by a user in the scenario shown in FIG. 1 or FIG. 2.

For ease of understanding, FIG. 8 shows a schematic diagram of an information procedure between users in an example in which SCC configuration is performed by a user in the scenario shown in FIG. 1 or FIG. 2. The case where the user 1 serves as a node performing relevant decision operations for carrier aggregation is still taken as an example. Firstly, the user 1 determines, based on the user basic information of the user 1 and the user 2, an implementation manner of the SCC configuration measurement event, and notifies the user 2. Next, the user 1 and the user 2 perform measurements based on the determined implementation manner of the SCC configuration measurement event, and the user 2 reports the measurement results to the user 1. The user 1 determines the configuration of the SCC based on the measurement results and notifies the user 2.

Although not shown in FIG. 8, in the case that the base station selects the PCC, the above flow should further include the following steps of: sharing the respective basic information between the user 1 and the user 2 before determining the operation of the SCC configuration measurement event; and determining, based on the basic information, a user who is to perform the decision operations.

The preparation for the carrier aggregation is completed in the above. In this case, the configured SCC may be activated to perform the carrier aggregation. For example, the measuring units of the first network node and the second network node may also periodically measure respective loads, and the configuration unit 102 may perform, based on load measurement results of the first network node and the second network node, activation or de-activation of the secondary carrier, in other words, perform determination on whether to perform the carrier aggregation and perform corresponding triggering operations. The measurement configuration of the load may be made and delivered by the network node serving as the decision node, or may be pre-configured. The period of the measurement is configured, for example, by the high layer signaling.

The measurement of the load may include, for example, measurement of at least one of a data cache amount or a data throughput of the network node.

For example, the configuration unit 102 may be configured to perform the activation of the secondary carrier in the case of meeting one of the following conditions: the loads of the first network node and the second network node both exceed a predetermined threshold; the load of a particular network node of the first network node and the second network node exceeds a predetermined threshold; and the load of one of the first network node and the second network node exceeds a predetermined threshold. In addition, the second network node is required to be informed to perform the activation of the SCC.

If the configuration unit 102 determines that the above activation condition is not met, and there is currently an SCC being aggregated, the configuration unit 102 performs de-activation operation of the SCC, for example, including canceling aggregation of the SCC at the first network node and informing the second network node to perform the de-activation operation. Otherwise, normal communication continues. Accordingly, the configuration unit 102 may further be configured to generate instruction information about the activation or de-activation of the SCC to inform the second network node.

The first network node and the second network node may respectively perform the determination of the activation condition for the secondary carrier, and the first network node synthesizes determination results of the first network node and the second network node. Alternatively, the second network node may report the load measurement results to the first network node, and the first network node performs the determination based on both the load measurement results of the first network node and the load measurement results of the second network node.

Figure 9:
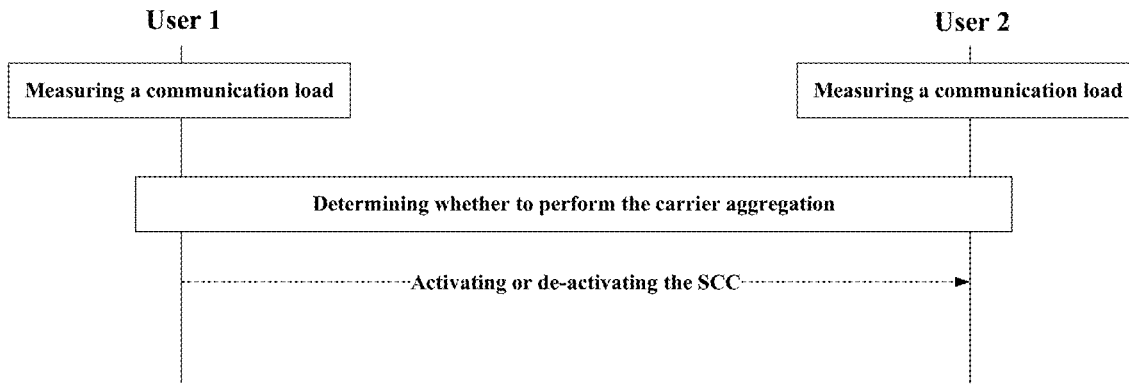
FIG. 9 is a schematic diagram showing an information procedure between users in an example in which SCC activation is performed by a user in the scenario shown in FIG. 1 or FIG. 2.

For ease of understanding, FIG. 9 shows a schematic diagram of an information procedure between users in an example in which SCC activation is performed by a user in the scenario shown in FIG. 1 or FIG. 2, in which the user 1 serving as the decision network node is still taken as an example. Firstly, the user 1 and the user 2 measure the communication loads respectively, for example, periodically. Secondly, based on the load measurement results, a determination is made as to whether to perform the carrier aggregation. As described above, the determination may be made by the user 1, or may be jointly made by the user 1 and the user 2. Finally, the activation or de-activation of the SCC is performed based on the determination result.

In summary, with the electronic apparatus 100 according to this embodiment, a carrier aggregation operation in a sidelink can be implemented, and the carrier aggregation in the sidelink can be performed in an OOC scenario by causing the network nodes in communication to cooperate with each other in place of the scheduling function of the network control node. It can be understood that the technology of carrier aggregation in the sidelink proposed in the present disclosure can be applied to current 4G communication systems, future 5G communication systems, and communication systems adopting more advanced technologies that may arise in future.

Second Embodiment

An example in which the electronic apparatus 100 is located on the network control node side will be described in this embodiment. In this example, the network control node performs the configuration of the PCC and the SCC, that is, a mode of scheduling by the network control node where the network control node performs relevant operations in the carrier aggregation, is applicable to the IC scenario.

In this mode, the network control node performs the selection and configuration of the PCC as described above, and periodically delivers measurement events to the network node through the PCC. A period of the measurement is configured, for example, by the high layer signaling. The network node measures the respective available CCs, for example, measures a parameter indicating communication quality of respective available CCs. Similarly, the parameter indicating the communication quality of the available CC may include information of signal strength on the corresponding CC. For example, the communication quality of the CC may be measured by measuring an adjacent carrier offset, a particular offset of an adjacent carrier frequency, a particular offset of an adjacent carrier, and the like. In addition, the network node estimates a time duration that the corresponding CC can be used for carrier aggregation, and provides the estimated time duration as a parameter of stability to the network control node. For example, the estimated time duration may be determined based on at least one of: a moving speed, a geographical location and a transceiving link occupation ratio of a network node, a carrier coverage range and carrier signal strength of the available component carrier.

The network node reports the measurement result to the network control node, and the network control node performs the configuration of the SCC based on the measurement result, for example, configures a CC that meets the predetermined condition as the SCC, and deletes SCC configuration of a CC that has already been configured as the SCC but no longer meets the predetermined condition, and is not aggregated. Exemplarily, if the communication quality of a CC is higher than a predetermined value and the stability of the CC is higher than a predetermined stability, the CC is considered to meet the predetermined condition and thus can be configured as the SCC. In addition, the network node may also report only the measurement result that meets the triggering condition to the network control node. The triggering condition may be set in advance.

In addition, it may also be set that the network control node delivers a measurement configuration to the network node, and the network node measures the available CCs according to the measurement configuration and autonomously selects the SCC based on the measurement result. The network node may determine a decision network node based on the basic information as described in the first embodiment, and the decision network node selects the SCC. Alternatively, the network nodes may autonomously select the SCC respectively. Then, the network nodes reports the selection results of the SCC to the network control node, and the network control node performs the SCC configuration based on the SCC selection results reported by the network nodes.

In other examples, the network control node may measure the available CCs and configure the SCC for the network node based on the measurement result, thereby reducing the processing load of the network node and reducing the signaling overhead.

Figure 10:
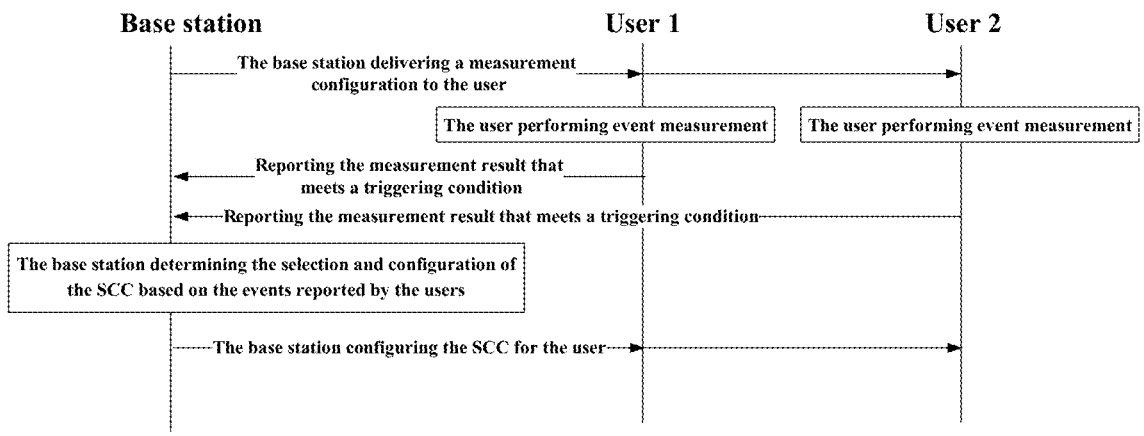
FIG. 10 shows an example of an information procedure of SCC configuration in a base station scheduling mode.
Figure 11:
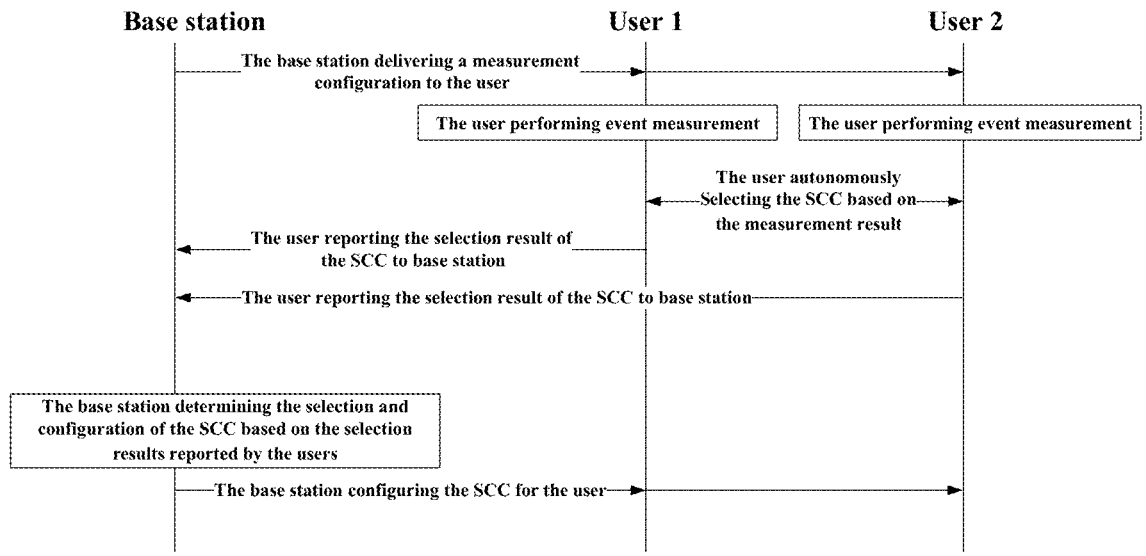
FIG. 11 shows another example of the information procedure of the SCC configuration in the base station scheduling mode.

Still taking the scenario shown in FIG. 1 as an example, FIG. 10 and FIG. 11 respectively show information procedures of the configuration of the SCC in the base station scheduling mode. FIG. 10 shows an example in which the user 1 and the user 2 report the measurement result meeting the triggering condition to the base station, and FIG. 11 shows an example in which the user 1 and the user 2 autonomously select the SCC respectively based on the measurement result and report the selection results to the base station. It should be understood that the information procedures are not limiting.

In this mode, the network control node may deliver a load measurement configuration to the network node, and the network node periodically measures the communication load and reports the measurement result that meets the triggering condition to the network control node. A period of the measurement and the triggering condition are configured, for example, by higher layer signaling. The network control node determines whether to activate the SCC based on the reported load measurement result. Alternatively, the network node may autonomously determine whether to activate the SCC based on the measurement result of the load, which may be completed by cooperation between the network nodes. For example, the SCC may be activated as long as the load of the network node on one side meets the activation condition.

Figure 12:
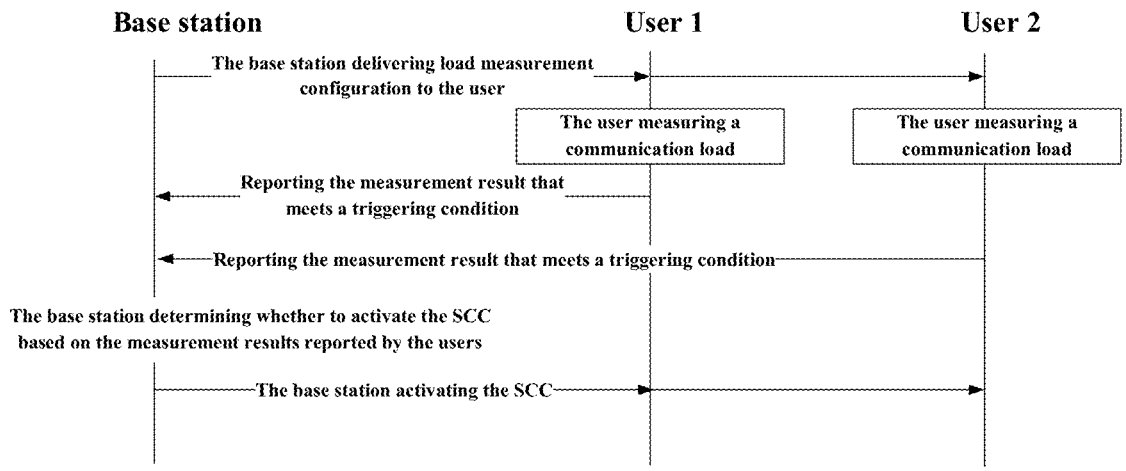
FIG. 12 shows an example of an information procedure of SCC activation in the base station scheduling mode.

Still taking the scenario shown in FIG. 1 as an example, FIG. 12 shows an example of an information procedure of activation of the SCC in the base station scheduling mode. In this example, the user 1 and the user 2 report the measurement results that meet the triggering condition, and the base station determines whether to activate the SCC based on these measurement results. On the other hand, the user 1 and the user 2 may also report all measurement results.

In summary, with the electronic apparatus 100 according to this embodiment, a carrier aggregation operation in a sidelink can be implemented.

Third Embodiment

Figure 13:
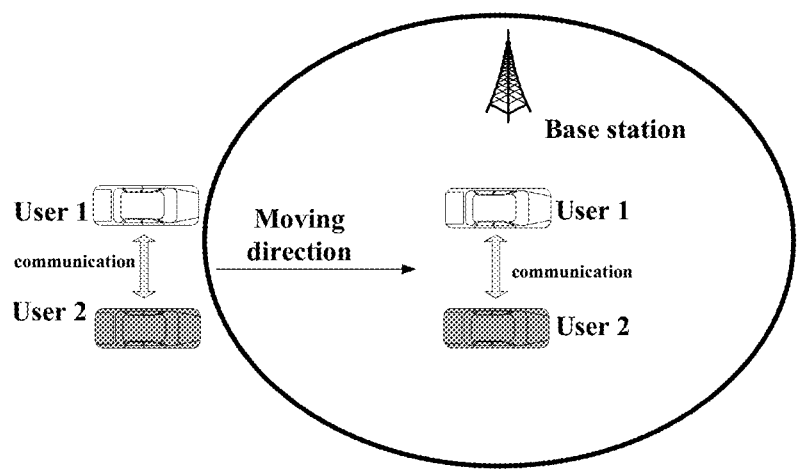
FIG. 13 is a schematic diagram showing switching from an Out-of-coverage (OCC) scenario to an In-coverage (IC) scenario.
Figure 14:
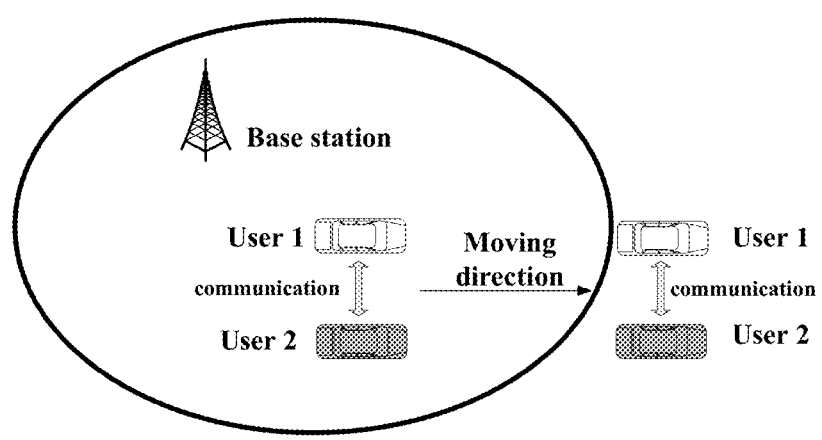
FIG. 14 is a schematic diagram showing switching from the IC scenario to the OOC scenario.

As mentioned above, due to the movement of the network node, mutual switching between the OCC scenario and the IC scenario may occur, as shown in FIGS. 13 and 14. FIG. 13 shows the switching from the OOC scenario to the IC scenario, and FIG. 14 shows the switching from the IC scenario to the OOC scenario.

In a case that the first network node and the second network node are currently in the OOC, the determining unit 101 of the electronic apparatus 100 may further be configured to determine whether the first network node and the second network node move into a coverage range of the network control node. In the case of positive determination, the configuration unit 102 confers with the second network node on whether to transfer the relevant decision operations in the carrier aggregation to the network control node. In the case of negative determination, current carrier aggregation operation is continued. In other words, when the switching from the OOC to the IC occurs, the communication parties confer with each other on whether to switch the carrier aggregation mode from the network node autonomous selection mode to the network control node scheduling mode. For example, the first network node and the second network node make the decision based on the basic information of the network nodes.

It should be noted that, the network control node scheduling mode in this embodiment may be a mode in which the network control node configures the PCC and the SCC in the second embodiment, or may be a mode in which the network control node configures the PCC and the network node configures the SCC in the first embodiment.

In a case that it is decided to perform the mode switching, the transceiving unit 104 provides the basic information and the carrier usage status information of the first network node and the second network node as well as status information of current carrier aggregation to the network control node. In this way, the network control node can continue the carrier aggregation operation based on the above information.

Figure 15:
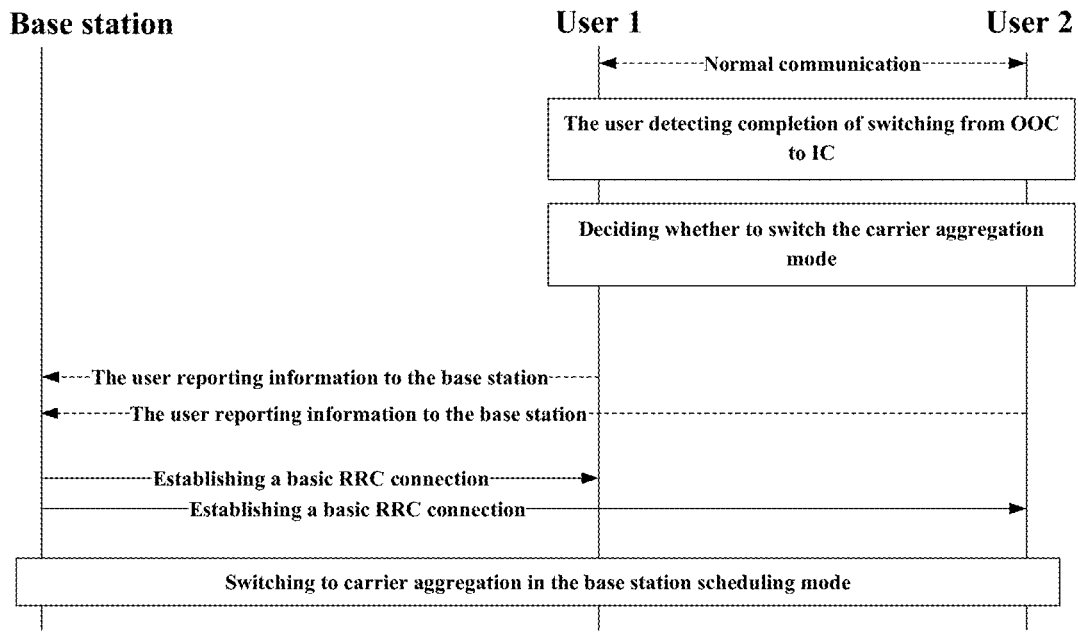
FIG. 15 is a schematic diagram showing an information procedure between a base station and a user in a case that a user autonomous selection mode is switched to the base station scheduling mode in the scenario shown in FIG. 13.

For ease of understanding, FIG. 15 shows an information procedure between a base station and a user in a case that a user autonomous selection mode is switched to a base station scheduling mode in the scenario shown in FIG. 13, in which the user 1 and the user 2 are performing carrier aggregation communication. The user 1 and the user 2 detect completion of the switching from the OOC to the IC, and jointly decide whether to switch the carrier aggregation mode. If it is decided to perform the switching, the user 1 and the user 2 may respectively report their basic information to the base station. In addition, the user 1 and the user 2 may also respectively report their carrier usage status and status information of the current carrier aggregation to the base station. Subsequently, the base station establishes a basic RRC connection respectively with the user 1 and the user 2, and switches to carrier aggregation in the base station scheduling mode.

On the other hand, in a case that the first network node and the second network node are currently in the IC and the network control node scheduling mode is employed, the determining unit 101 may further be configured to determine whether the first network node and the second network node move outside of a coverage range of the network control node, and in the case of positive determination, cooperate with the second network node to perform the carrier aggregation, that is, switch to the network node autonomous selection mode.

Figure 16:
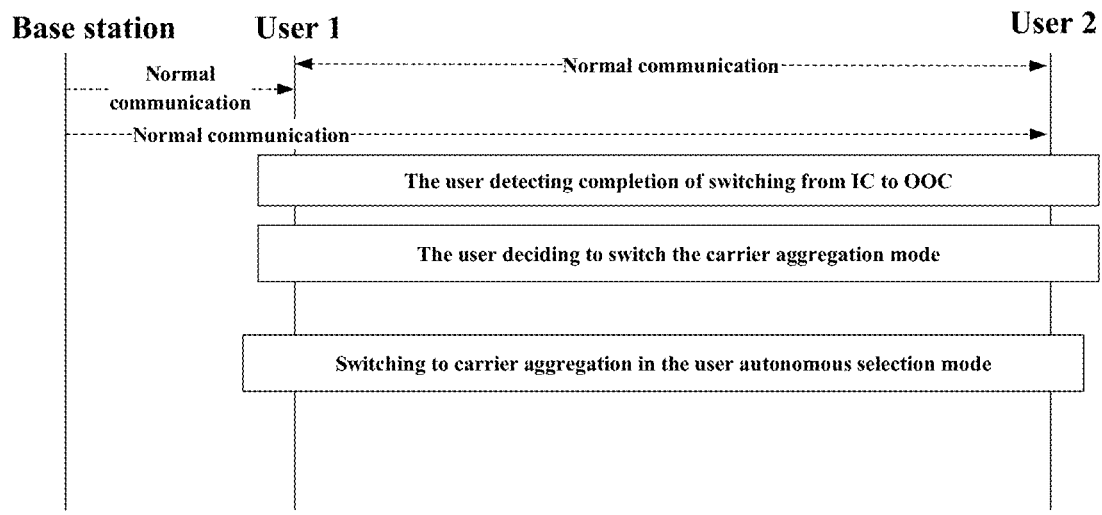
FIG. 16 is a schematic diagram showing an information procedure between a base station and a user in a case that the base station scheduling mode is switched to the user autonomous selection mode in the scenario shown in FIG. 14.

For ease of understanding, FIG. 16 shows an information procedure between a base station and a user in a case that the base station scheduling mode is switched to the user autonomous selection mode in the scenario shown in FIG. 14, in which the user 1 and the user 2 are performing carrier aggregation communication in the base station scheduling mode. The user 1 and the user 2 detect completion of the switching from the IC to the OOC, and thus decide to switch the carrier aggregation mode. The user 1 and the user 2 cooperate with each other, for example, by sharing the basic information or performing selection of the decision network node, so as to switch to carrier aggregation in the user autonomous selection mode.

In this embodiment, an implementation of carrier aggregation in switching between different modes in the sidelink scenario is provided, ensuring that the carrier aggregation continues normally.

Fourth Embodiment

In this embodiment, carrier aggregation in a multicast or broadcast mode in a sidelink scenario will be described below. Referring to FIGS. 4 and 5, the configuration unit 102 may further be configured to generate relevant information about the primary carrier and the secondary carrier used in the carrier aggregation, to broadcast to other network nodes. For example, the transceiving unit 104 may transmit the broadcast information via a physical sidelink broadcast channel (PSBCH). For example, the relevant information may be broadcasted in a format of a system information block (SIB). The relevant information may include one or more of the following: carrier frequency, carrier sequence number, synchronization information, resource pool allocation and priority level of the primary carrier and the secondary carrier.

For example, the relevant information may be broadcasted by using the SIB21. The SIB21 includes a v2x-InterFreqInfoList instruction, which includes information about carriers (a parameter sequence number of 0 corresponds to a primary carrier, and other sequence numbers respectively correspond to secondary carriers) that can be used by the user, a resource pool (V2X-CommTxPoolNormalCcommon/Exceptional), setting (ZoneConfig) of a resource Zone, carrier frequency, synchronization information, priority level, and the like. In addition, the inter-carrier scheduling resource allocation may also be performed according to the corresponding sequence number. For example, CIF=1 in DCI-5A corresponds to a carrier of a first entry, and so on.

Further, in a case that the network node where the electronic apparatus 100 is located is a network node that receives the broadcast information, the configuration unit 102 may further be configured to determine, based on broadcast information about the primary carrier and the secondary carrier used in the carrier aggregation from other network nodes, whether to perform the carrier aggregation or a specific manner of the carrier aggregation, for example, determine to perform the carrier aggregation for which carriers.

The content broadcasted by other network nodes may include the above mentioned relevant information, the message content and the like. The network node periodically performs listening on the available carrier frequency band. Upon receiving a broadcast/multicast signal of another network node, it is determined whether the message needs to be listened. In the case pf positive determination, the carrier aggregation is performed according to the broadcast information.

Each network node determines, according to V2X-CommRXinterestedFreqListN2X-CommTxFreqList configured for the network node by the upper level, whether multiple carriers can be used in the transceiving process. For example, the configuration unit 102 may parse the broadcast information according to the V2X-CommRXinterestedFreqList parameter configured by the upper level, and obtain information such as the frequency, resource pool, synchronization information, priority level and the like of the possible aggregated carrier after the parsing.

Figure 17:
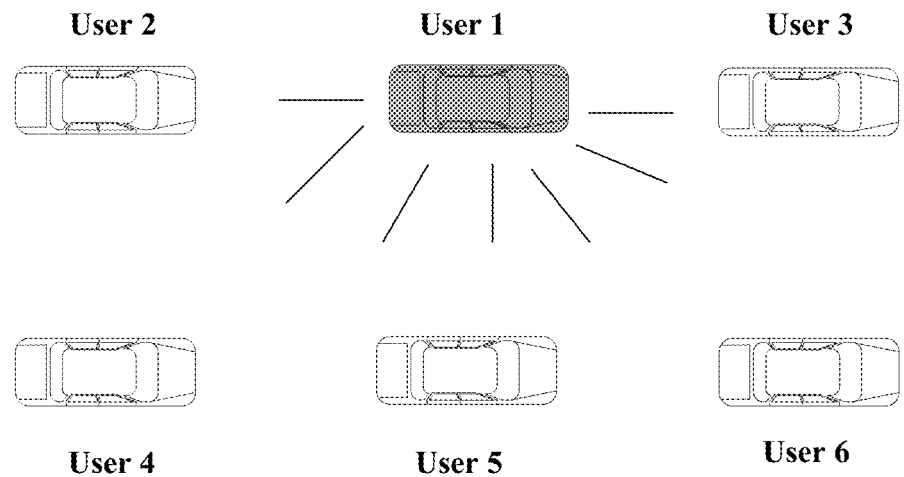
FIG. 17 shows an application example of a scenario in which a sidelink is used for multicast or broadcast.

FIG. 17 shows an application example of a scenario in which a sidelink is used for multicast or broadcast, in which a user is taken as an example of a network node. The user 1 to the user 6 are all outside of the coverage range of the base station, thus the Sidelink communication is performed in the user autonomous selection mode. The user 1 is prepared to transmit a group of message content of a large amount of data to other users, and requires each user to receive and process the message content within a certain time period. The user 1 sends a request to transmit the group of message content in a carrier aggregation manner.

Firstly, the user 1 selects the primary carrier and the secondary carriers that are most suitable for the carrier aggregation for the user 1, by using the primary carrier and the secondary carrier selection method, according to the basic information of the user 1, the surrounding available carrier status and the like, and names them CC0, CC1/2/3 . . . , respectively. Further, the user 1 sets synchronization information and the like for the carrier aggregation operation according to the basic information of the user, the selected carrier status, and the message content.

Next, the user 1 broadcasts the relevant information of the carriers used for carrier aggregation in the form of SIB21 on the PSBCH. The user 1 may repeatedly broadcast this message at a certain frequency so that as many users as possible can receive the message. The frequency of the broadcasting may be configured by high level signaling.

The user 2 to the user 6 continuously perform listening on the PSBCH. For example, the user 2 is not configured with information for multiple-carrier usage, and thus cannot perform carrier aggregation to respond to the request of the user 1. The user 3 is configured with information for multiple-carrier usage, but the user 3 knows that the carrier selected by the user 1 is not available to the user 3 or is being occupied after receiving and parsing the broadcast information, and thus cannot perform carrier aggregation to respond to the request of the user 1. The user 4 is configured with information for multiple-carrier usage and successfully parses the broadcast information. However, the user 4 determines that the message content transmitted by the user 1 is useless to the user 4, and thus determines not to respond to the request of the user 1. The user 5 and the user 6 are configured with information for multiple-carrier usage and successfully parse the broadcast information, and determines to respond to the request of the user 1. That is, the users 5 and 6 perform listening on the specified carrier according to the broadcast message, and communicate on the multiple carriers according to the synchronization message, to achieve the carrier aggregation in the broadcast mode. It should be understood that FIG. 17 only shows an example of carrier aggregation in the broadcast/multicast form, which is not limiting.

Fifth Embodiment

In this embodiment, some application examples of carrier aggregation in a sidelink scenario are given below. It should be understood that these application examples are exemplary but not limiting.

First Example

Figure 18:
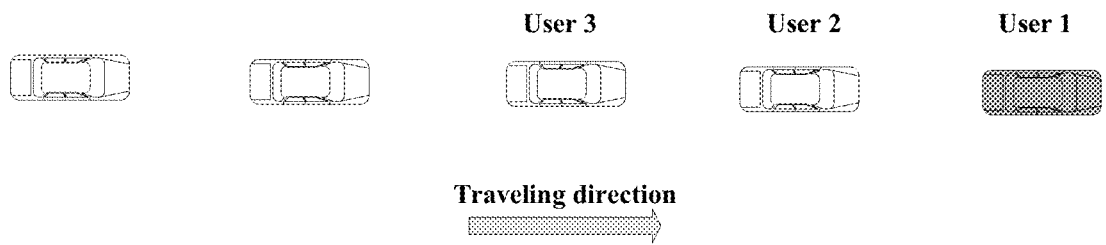
FIG. 18 shows an application example of a Plantooning communication scenario.

In this example, a sidelink exists between platoon members in a Plantooning communication scenario. As shown in FIG. 18, in a platoon, a member 1 functions as a platoon head, and members 2/3 function as platoon members. In the platoon driving scenario, communication of the users has characteristics of large data volume, low delay requirement, high accuracy requirement and the like. Carrier aggregation is an effective method to cope with the above requirements. The carrier aggregation in this scenario is carrier aggregation in the user autonomous selection mode.

For example, the user determines to perform carrier aggregation communication with other users according to factors of the basic information of the user, the communication load and the like. Users exchange the respective basic information with each other through a basic communication link. Taking the user 1 and the user 2 as an example, after receiving the basic information of the user 2, the user 1 compares the basic information of the user 2 with the basic information of the user 1, proposes that the subsequent decision operations for the carrier aggregation are performed by the user 1, and transmits the proposal as a request to the user 2. After receiving the request of the user 1, the user 2 compares the proposal of the user 1 with the determination result made by the user 2. If the comparison result is consistent, the user 2 feeds back that the user 2 agrees with the request. If the comparison result is inconsistent, the user 2 feeds back that the user 2 disagrees with the request and sends a new request to the user 1 until the two parties reach an agreement. Here, it is assumed that the two parties agree that the user 1 performs the subsequent decision operations, in this case, the user 1 serves as the decision network node.

Subsequently, the user 1 transmits a carrier measurement configuration message to the user 2, to request the user 2 to measure the relevant parameters of the available component carriers of the user 2, while the user 1 also measures the relevant parameters of the available component carriers of the user 1. After completing the measurement, the user 2 reports the measurement result to the user 1. After receiving the report of the user 2, the user 1 determines carriers (including a primary carrier and one or more secondary carriers) suitable for carrier aggregation with the user 2 in combination with the measurement result of the user 1, for example, according to the carrier selection/configuration rule described in the above embodiments, and informs the determination result to the user 2. The user 2 performs the carrier aggregation communication at the agreed time and frequency according to the received carrier information transmitted by the user 1, the synchronization information and the like. The user 1 may similarly perform the carrier aggregation operation with other users, which are not described herein again.

Second Example

Figure 19:
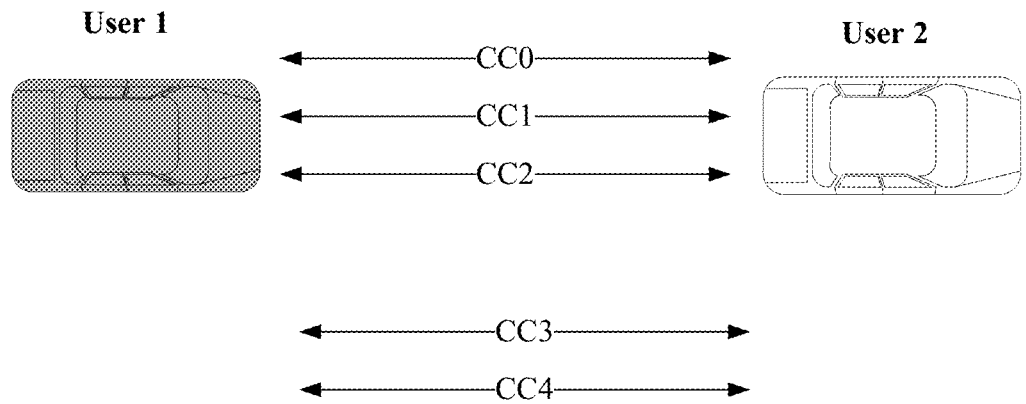
FIG. 19 is a schematic diagram showing a conversion mechanism of a primary carrier/secondary carrier in sidelink carrier aggregation communications.

In this example, a conversion mechanism of a primary carrier/secondary carrier in the carrier aggregation communication is shown. As shown in FIG. 19, the user 1 and the user 2 are performing the carrier aggregation communication, where CC0 is the primary carrier, CC1 and CC2 are secondary carriers that are aggregated for communication, and CC3 and CC4 are other carriers that do not participate in the carrier aggregation communication. Carriers used for carrier aggregation between users may be adjusted due to factors such as user movement, a change in a communication condition or the like.

For example, as previously described, the user periodically evaluates the communication load. If the user determines that the communication load is low at a certain time, the user may make a decision to de-activate a secondary carrier CC2 to improve the spectrum utilization ratio. The user may be a user selected as the decision network node, for example, assumed to be the user 1. The user 1 informs another user 2 of the basic information of the carrier CC2 to be de-activated, including carrier frequency, synchronization information and the like. The user 2 de-activates the carrier CC2 according to the information, alleviating the waste of spectrum resources on the premise of ensuring the communication quality.

In addition, the user periodically measures the available carriers (for example, in the manner described above), and the user 1 serving as the decision user determines whether the measured carrier is suitable for aggregation and further determines whether to configure the carrier as an SCC. If the user 1 determines that the condition of the CC2 is not suitable to serve as the SCC, and meanwhile the CC3 is more suitable to serve as the SCC, the user 1 makes a decision to delete the secondary carrier configuration of the CC2, and configures the CC3 as the secondary carrier.

The user may further periodically measure the primary carrier CC0 (for example, in the manner described above). If the user 1 determines that the current primary carrier CC0 does not meet the communication requirement of the primary carrier at a certain time, and at the same time the carrier CC4 can meet the condition as the primary carrier, the user 1 makes a decision to perform the primary carrier switching and informs another user 2 of the relevant primary carrier switching information, to ensure the quality of the carrier aggregation communication.

Third Example

In this example, the case of an asymmetric configuration of the primary carrier in the user autonomous selection mode is shown. In the user autonomous selection mode, the selection of the primary carrier in carrier aggregation may be asymmetric considering that communication environments and conditions of communication parties are different. As mentioned above, the factors affecting the selection of the primary carrier include the basic information of the user. It can be understood that, especially in a case that different users have different resource pools, different primary carriers may be configured for the communication parties when they respectively function as the receiver/transmitter.

When sharing user basic information, the users may respectively determine whether they can use the same resource pool with the opposing party user in an independent way. For example, it is determined whether a sending resource pool of the user 1 can meet resource usage requirements for the receiving of the user 2, and whether a receiving resource pool of the user 1 can meet resource usage requirements for the sending of the user 2. If the above conditions are met, usage of a unified resource pool may be considered, and a symmetric primary carrier may be configured. Otherwise, the asymmetric primary carrier may be considered. The communication parties respectively perform the determination, and the determination result is one of reference basis for the selection of the primary carrier.

Fourth Example

In this example, at least a part of the available component carriers are located in an unlicensed frequency band, and the measuring unit 103 may measure the at least a part of the available component carriers by spectrum sensing on the unlicensed frequency band.

In the future implementation of carrier aggregation, it is inevitable that the unlicensed frequency band is used as a secondary carrier for aggregation to obtain a larger communication bandwidth. The unlicensed frequency band communication has characteristics of low power and small coverage range. Therefore, the frequency band is more suitable for carrier aggregation at a close distance between users in the Sidelink scenario, especially in the user autonomous selection mode. For example, the primary carrier in the licensed frequency band acts as a control carrier, while the secondary carrier in the unlicensed frequency band acts as the aggregated carrier to provide additional radio resources.

For example, the user configures the primary carrier according to the carrier aggregation manner in the LTE-A scenario, and the base station or the user performs sensing on the unlicensed frequency band, and learns the usage status of the unlicensed frequency band (that is, the indication of the communication quality) by means of the signal strength parameter such as RSRP. The base station or the user, for example, preferentially configures the unlicensed frequency band with a smaller RSRP as the SCC according to the configuration criteria of the unlicensed frequency band. The base station or the user determines whether to trigger an activation event of the SCC based on the load conditions on the carrier in communication, to perform carrier aggregation if the load meets the triggering condition.

It should be understood that the carrier aggregation performed in the unlicensed frequency band does not contradict the carrier aggregation performed in the conventional LTE-A, and the same primary carrier may simultaneously aggregate carriers in the licensed frequency band and carriers in the unlicensed frequency band. The specific carrier aggregation manner may be determined according to the actual communication situations and carrier quality.

In addition, in the process of performing carrier activation to implement carrier aggregation, the trigger threshold for the carrier in the licensed frequency band may be different from the trigger threshold for the carrier in the unlicensed frequency band, because the available bandwidth in the unlicensed frequency band is large, and there is a gap between the carrier in the unlicensed frequency band and a carrier aggregated in the LTE-A scenario in terms of the channel quality and the like. Therefore, when selecting a secondary carrier for activation, the secondary carriers in the two frequency bands should be fully compared, and the secondary carrier used for aggregation should be selected according to actual conditions.

Fifth Example

In this example, the primary carrier and/or at least a part of the secondary carriers for the carrier aggregation may be transmitted in a format of millimeter wave. With the development of communication technologies and the increasing demand for spectrum resources, the millimeter wave technology may be used for wireless communications in higher frequency bands in the future in order to make full use of the spectrum resources. The millimeter wave technology will become an important technology in 5G communications. As described above, in the carrier aggregation of the sidelink, a component carrier in a millimeter wave band may be used as the primary carrier, or a component carrier in a millimeter wave band may be used as a secondary carrier or a part of secondary carriers. Therefore, coexistence, interference, modulation and demodulation, suppression, and the like may occur between the electromagnetic wave transmission under normal conditions and the transmission of millimeter waves.

In this case, the base station or the user will receive messages in two frequency bands. For example, carriers of different wavelengths may be demodulated, so that the carriers of different wavelengths can coexist and cooperatively transmit messages, to obtain the larger communication bandwidth. It should be noted that in the carrier aggregation process, the measurement, configuration, and the like on each carrier are independently performed. Therefore, for users using electromagnetic waves of different wavelengths, it is not necessary to consider the cooperative operation, and only necessary to demodulate the result into a well-compatible expression to enable the base station or the user to fully learn the relevant situation of the carrier aggregation.

In addition, in the case of using the millimeter wave as the secondary carrier for carrier aggregation, since the details of the operations such as configuration, activation, de-activation and the like are different from those in the carrier aggregation in the LTE-A scenario, a corresponding decision threshold is required to be specified according to characteristics of the millimeter waves.

Sixth Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the method described below may be executed by a computer-executable program completely, although the hardware and/or firmware of the electronic apparatus for wireless communications can also be used in the methods.

Figure 20:
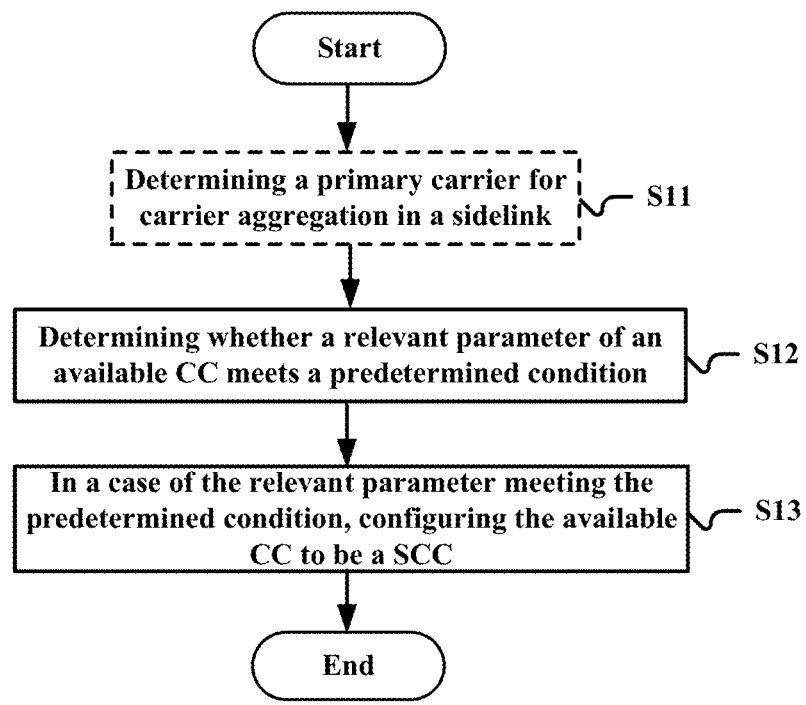
FIG. 20 shows a flowchart of a method for wireless communications according to an embodiment of the present disclosure.

FIG. 20 shows a flowchart of a method for wireless communications according to an embodiment of the present disclosure. The method includes: determining whether a relevant parameter of an available component carrier in a sidelink meets a predetermined condition (S12); and in a case of the relevant parameter meeting the predetermined condition, configuring the available component carrier to be a secondary carrier for carrier aggregation in the sidelink (S13).

As shown by a dashed line block in FIG. 20, the e method may further include a step S11 of determining, based on the relevant parameter of each available component carrier, a primary carrier for the carrier aggregation in the sidelink. For example, in some cases, different primary carriers may be determined for the first network node and the second network node based on the measurement results of the available component carriers, respectively.

The relevant parameter of the available component carrier includes a parameter indicating communication quality of the corresponding available component carrier. The parameter indicating the communication quality of the corresponding available component carrier includes, for example, information of signal strength on the corresponding component carrier. The predetermined condition may be set that the signal strength on the corresponding component carrier is lower than a predetermined threshold.

For example, the relevant parameter of the available component carrier further includes a parameter indicating stability of the corresponding available component carrier. The parameter indicating the stability of the corresponding available component carrier includes an estimated time duration when carrier aggregation communication can be performed with the corresponding available component carrier at communication quality meeting a requirement. The estimated time duration may be determined based on at least one of: a moving speed, a geographical location and a transceiving link occupation ratio of a network node, a carrier coverage range and carrier signal strength of the available component carrier.

In an example, the method is performed by a first network node on one side of the sidelink, and the first network node cooperates with a second network node on the other side of the sidelink to perform the carrier aggregation.

The first network node and the second network node share basic information of the respective network nodes, and determine, at least based on the basic information, whether to perform the carrier aggregation. The basic information includes one or more of the following: a type of the network node, a moving speed of the network node, a geographical location of the network node, capability of the network node, transceiving link status of the network node, and transceiving link occupation status.

In an example, it is determined, based on the shared basic information of the network nodes, that relevant decision operations in the carrier aggregation are to be performed by the first network node, and the first network node cooperates with the second network node to achieve agreement.

Measurement operations to be performed on the available component carriers by the first network node and the second network node may be configured based on the shared basic information of the network nodes, and relevant parameters of the available component carriers measured by respective network nodes may be acquired.

The first network node and the second network node periodically measure a certain proportion of available component carriers determined based on the basic information to acquire the relevant parameters of the available component carriers, and the second network node provides its measurement results to the first network node. Exemplarily, the measurement results of the second network node may be provided to the first network node when meeting a predetermined event triggering condition.

The first network node and the second network node further periodically measure respective loads, and perform, based on load measurement results of the first network node and the second network node, activation or de-activation of the secondary carrier.

For example, the activation of the secondary carrier is performed in the case of meeting one of the following conditions: the loads of the first network node and the second network node both exceed a predetermined threshold; the load of a particular network node of the first network node and the second network node exceeds a predetermined threshold; and the load of one of the first network node and the second network node exceeds a predetermined threshold.

The first network node further generates instruction information about the activation or de-activation of the secondary carrier to inform the second network node.

In an example, the first network node generates relevant information about the primary carrier and the secondary carrier used in the carrier aggregation, to broadcast to other network nodes. The relevant information may be broadcasted in a format of a system information block in a physical sidelink broadcast channel, and the relevant information may include one or more of the following: carrier frequency, carrier sequence number, synchronization information, resource pool allocation and priority level of the primary carrier and the secondary carrier.

Accordingly, other network nodes may determine, based on broadcast information about the primary carrier and the secondary carrier used in the carrier aggregation from the first network node, whether to perform the carrier aggregation or a specific manner of the carrier aggregation.

In another example, the first network node and the second network node may measure the relevant parameters of the available component carriers and provide measurement results to a network control node, and acquire, from the network control node, information of the primary carrier selected by the network control node based on the measurement results. In addition, the first network node and the second network node may further provide basic information and load measurement results of the respective network nodes to the network control node, so that the network control node determines whether to perform the carrier aggregation.

The first network node and the second network node may further periodically measure the relevant parameters of the available component carriers to perform the determination in step S12 and the configuration of the secondary carrier in step S13.

In an example, a resource pool for the primary carrier and a resource pool for the secondary carrier are set to be the same with each other. Alternatively, a resource pool for the primary carrier and a resource pool for the secondary carrier may also be configured to be different from each other.

To avoid collision, a component carrier selected as the primary carrier and a component carrier configured as the secondary carrier may be marked.

In another example, it may further be determined whether the first network node and the second network node move into a coverage range of the network control node from outside of the coverage range. In the case of positive determination, the first network node confers with the second network node on whether to transfer the relevant decision operations in the carrier aggregation to the network control node. In the case of negative determination, current carrier aggregation operation is continued. For example, in the case that it is to transfer the relevant decision operations in the carrier aggregation to the network control node, the basic information and the carrier usage status information of the first network node and the second network node as well as status information of current carrier aggregation may be provided to the network control node.

In yet another example, it may further be determined whether the first network node and the second network node move outside of a coverage range of the network control node from within the coverage range. In the case of positive determination, the first network node cooperates with the second network node to perform the carrier aggregation.

At least a part of the available component carriers may be located in unlicensed frequency band. For example, the at least a part of the available component carriers may be measured by spectrum sensing on the unlicensed frequency band. The primary carrier and/or at least a part of the secondary carriers for the carrier aggregation may be transmitted in a format of millimeter wave.

It should be noted that the above-described methods may be used in combination or individually, the details thereof have been described in detail in the first to fifth embodiments, which are not repeated herein.

The technology of the present disclosure can be applied to various products. For example, the electronic apparatus 100 may be implemented as a terminal device. The terminal device may be realized as a mobile terminal (such as a smartphone, a tablet personal computer (PC), a notebook PC, a portable game terminal, a portable/dongle type mobile router, and a digital camera), or an in-vehicle terminal (such as a car navigation device). The terminal device may also be realized as a terminal (which is also referred to as a machine type communication (MTC) terminal) that performs machine-to-machine (M2M) communication. Furthermore, the terminal device may be a wireless communication module (such as an integrated circuit module including a single die) mounted on each of the terminals.

Application Example Regarding the Terminal Device

First Application Example

Figure 21:
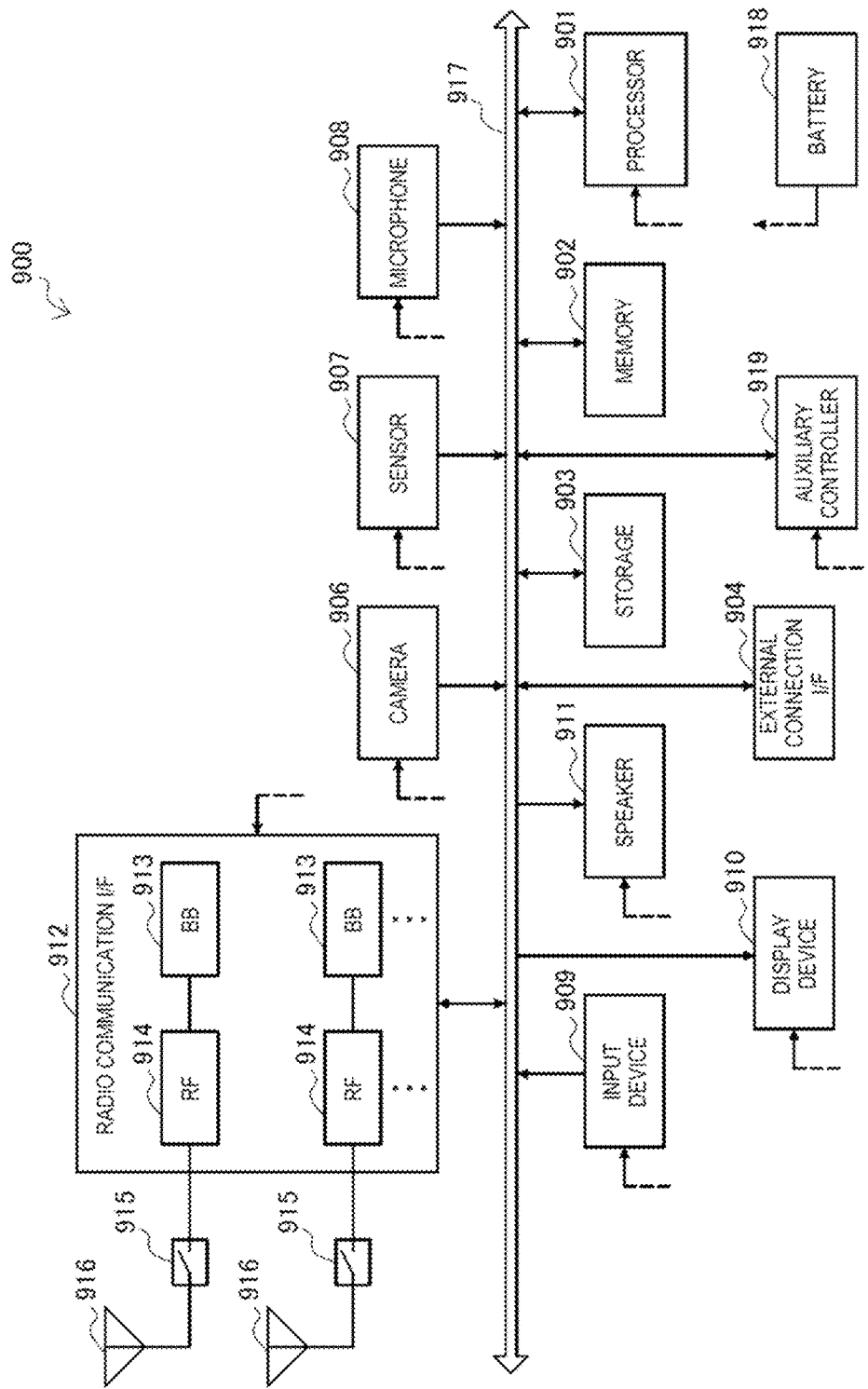
FIG. 21 is a block diagram illustrating an example of a schematic configuration of a smart phone to which the technology of the present disclosure may be applied.

FIG. 21 is a block diagram illustrating an example of a schematic configuration of a smartphone 900 to which the technology of the present disclosure may be applied. The smart phone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smart phone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smart phone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smart phone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smart phone 900. The speaker 911 converts audio signals that are outputted from the smart phone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 21 shows a case where one RF link is connected to one antenna, which is only illustrative and a case where one RF link is connected to multiple antennas through multiple phase shifters may exist. The radio communication interface 912 may be a chip module having the BB processor 913 and the RF circuit 914 integrated thereon. The radio communication interface 912 may include multiple BB processors 913 and multiple RF circuits 914, as shown in FIG. 21. Although FIG. 21 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smart phone 900 may include the multiple antennas 916, as shown in FIG. 21. Although FIG. 21 shows the example in which the smart phone 900 includes the multiple antennas 916, the smart phone 900 may also include a single antenna 916.

Furthermore, the smart phone 900 may include the antenna 916 for each wireless communication scheme. In this case, the antenna switches 915 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 21 via feeder lines that are partially shown as dashed lines in FIG. 21. The auxiliary controller 919 operates a minimum necessary function of the smart phone 900, for example, in a sleep mode.

In the smartphone 900 shown in FIG. 21, the transceiving unit 104 described in the first to fifth embodiments may be implemented by the radio communication interface 912. At least part of functions may also be implemented by the processor 901 or the auxiliary controller 919. For example, the processor 901 or the auxiliary controller 919 may perform the configuration of the PCC and the SCC, and the activation or de-activation of the SCC by performing the functions of the determining unit 101 and the configuration unit 102, and may perform measurement of communication quality or stability of the available component carrier and load measurement by performing the functions of the measuring unit 103.

Second Application Example

Figure 22:
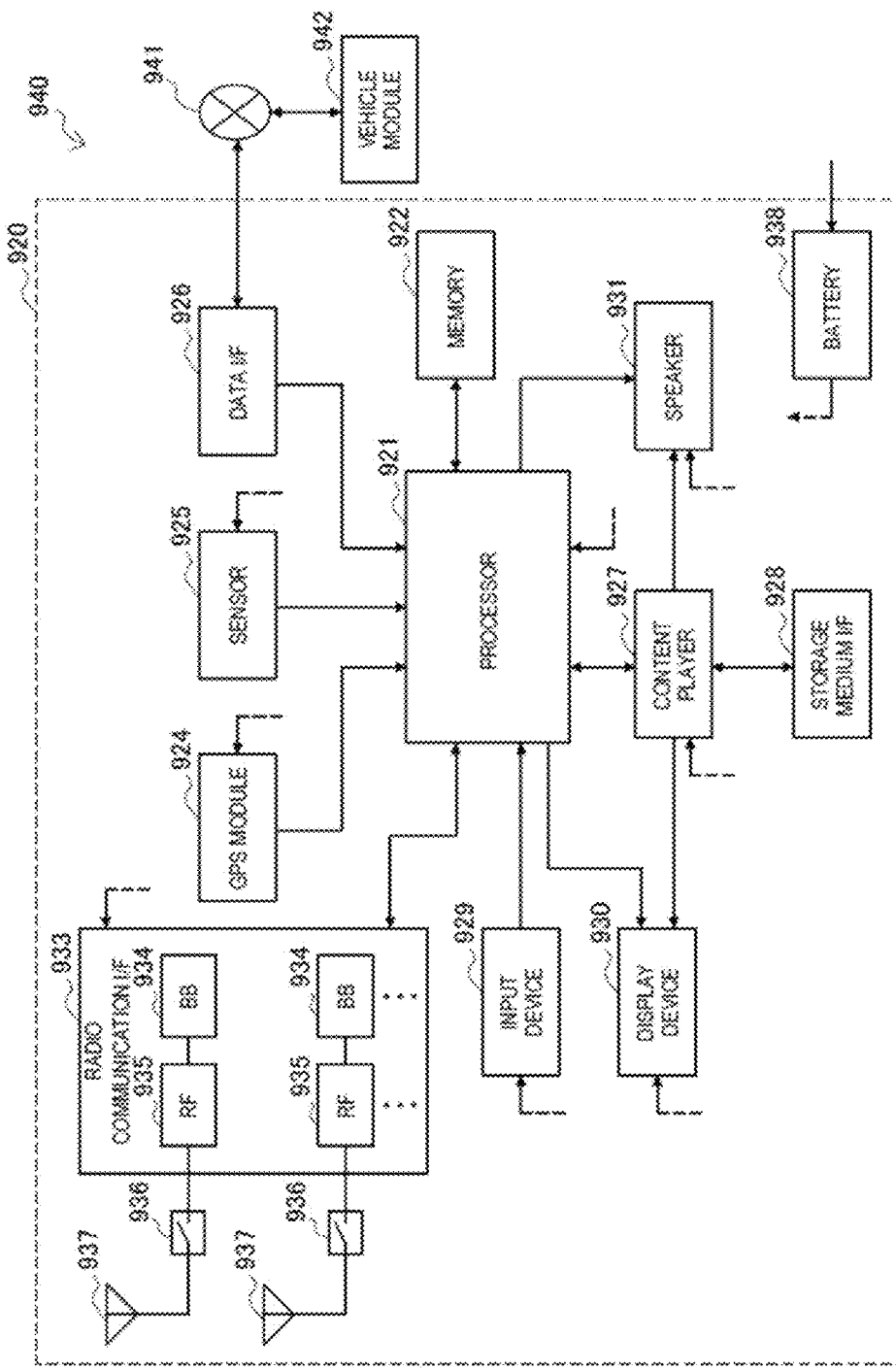
FIG. 22 is a block diagram illustrating an example of a schematic configuration of an car navigation device to which the technology of the present disclosure may be applied.

FIG. 22 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sounds for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating, and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 22. Although FIG. 22 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 22, the car navigation apparatus 920 may include the multiple antennas 937. Although FIG. 22 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 22 via feeder lines that are partially shown as dash lines in FIG. 22. The battery 938 accumulates power supplied from the vehicle.

In the car navigation apparatus 920 shown in FIG. 22, the transceiving unit 104 described in the first to fifth embodiments may be implemented by the radio communication interface 933. At least part of functions may also be implemented by the processor 921. For example, the processor 921 may perform the configuration of the PCC and the SCC, and the activation or de-activation of the SCC by performing the functions of the determining unit 101 and the configuration unit 102, and may perform measurement of communication quality or stability of the available component carrier and load measurement by performing the functions of the measuring unit 103.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In a case of implementing the present disclosure in software or firmware, the program consisting of the software is installed to a computer with a dedicated hardware structure (such as a general purpose computer 2300 shown in FIG. 23) from the storage medium or network. The computer, when being installed with the various programs, performs various functions.

Figure 23:
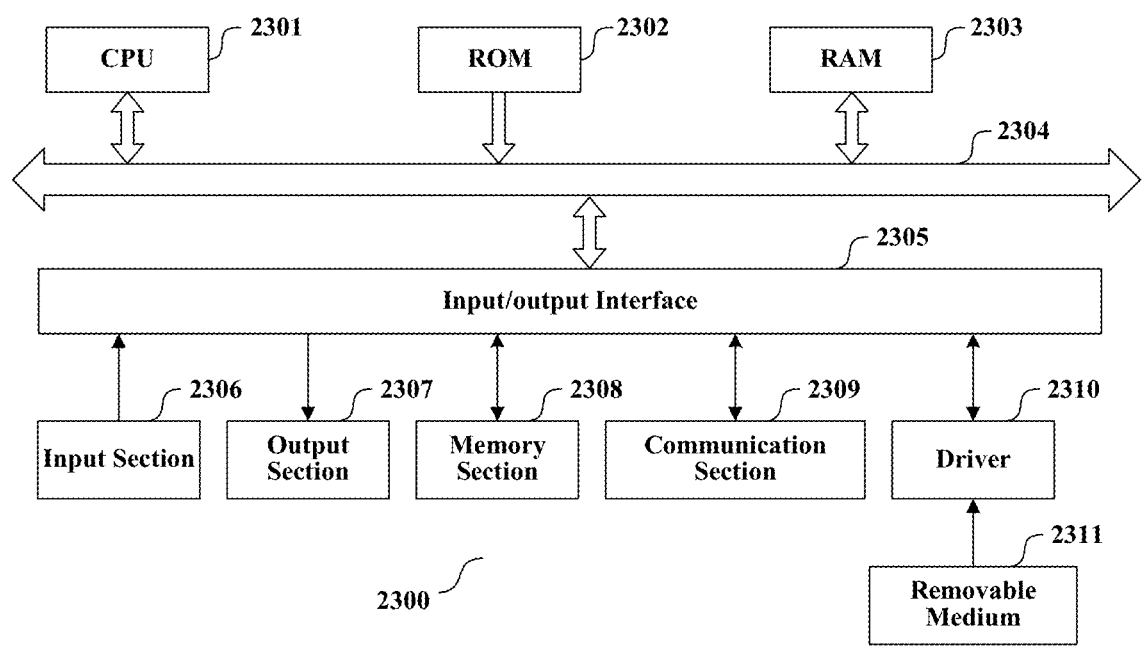
FIG. 23 is a block diagram of an exemplary block diagram illustrating the structure of a general purpose personal computer capable of realizing the method and/or device and/or system according to the embodiments of the present disclosure.

In FIG. 23, a central processing unit (CPU) 2301 executes various processing according to a program stored in a read-only memory (ROM) 2302 or a program loaded to a random access memory (RAM) 2303 from a memory section 2308. The data needed for the various processing of the CPU 2301 may be stored in the RAM 2303 as needed. The CPU 2301, the ROM 2302 and the RAM 2303 are linked with each other via a bus 2304. An input/output interface 2305 is also linked to the bus 2304.

The following components are linked to the input/output interface 2305: an input section 2306 (including keyboard, mouse and the like), an output section 2307 (including displays such as a cathode ray tube (CRT), a liquid crystal display (LCD), a loudspeaker and the like), a memory section 2308 (including hard disc and the like), and a communication section 2309 (including a network interface card such as a LAN card, modem and the like). The communication section 2309 performs communication processing via a network such as the Internet. A driver 2310 may also be linked to the input/output interface 2305, if needed. If needed, a removable medium 2311, for example, a magnetic disc, an optical disc, a magnetic optical disc, a semiconductor memory and the like, may be installed in the driver 2310, so that the computer program read therefrom is installed in the memory section 2308 as appropriate.

In the case where the foregoing series of processing is achieved through software, programs forming the software are installed from a network such as the Internet or a memory medium such as the removable medium 2311.

It should be appreciated by those skilled in the art that the memory medium is not limited to the removable medium 2311 shown in FIG. 23, which has program stored therein and is distributed separately from the apparatus so as to provide the programs to users. The removable medium 2311 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2302 and the memory section 2308 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporarily in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
   processing circuitry, configured to:
   determine whether a relevant parameter of an available component carrier in a sidelink meets a predetermined condition; and
   in a case of the relevant parameter meeting the predetermined condition, configure the available component carrier to be a secondary carrier for carrier aggregation in the sidelink, wherein
   the electronic apparatus is used for a first network node on one side of the sidelink,
   the processing circuitry is configured to cooperate with a second network node on the other side of the sidelink to perform the carrier aggregation,
   the processing circuitry is configured to share basic information of respective network nodes between the first network node and the second network node, and determine, at least based on the basic information, whether to perform the carrier aggregation, wherein the basic information includes one or more of the following:
   a type of the network node,
   a moving speed of the network node,
   a geographical location of the network node,
   capability of the network node,
   transceiving link status of the network node, and
   transceiving link occupation status, and
   the processing circuitry is further configured to determine, based on the shared basic information of the network nodes, that relevant decision operations in the carrier aggregation are to be performed by the first network node, and cooperates with the second network node to achieve agreement.

2. The electronic apparatus according to claim 1, wherein the processing circuitry is further configured to determine, based on the relevant parameter of each available component carrier, a primary carrier for the carrier aggregation in the sidelink.

3. The electronic apparatus according to claim 1, wherein the relevant parameter of the available component carrier comprises a parameter indicating communication quality of the corresponding available component carrier.

4. The electronic apparatus according to claim 3, wherein the parameter indicating the communication quality of the corresponding available component carrier comprises information of signal strength on the corresponding component carrier,
   wherein the predetermined condition comprises: the signal strength on the corresponding component carrier is lower than a predetermined threshold.

5. The electronic apparatus according to claim 3, wherein the relevant parameter of the available component carrier further comprises a pa ram indicating stability of the corresponding available component carrier.

6. The electronic apparatus according to claim 5, wherein the parameter indicating the stability of the corresponding available component carrier comprises an estimated time duration when carrier aggregation communication can be performed with the corresponding available component carrier at communication quality meeting a requirement,
wherein the estimated time duration is determined based on at least one of: a moving speed of a network node corresponding to the electronic apparatus, a geographical location of the network node, a transceiving link occupation ratio of the network node, a carrier coverage range of the available component carrier, and carrier signal strength of the available component carrier.

7. The electronic apparatus according to claim 1, wherein the processing circuitry is further configured to configure, based on the shared basic information of the network nodes, measurement operations to be performed on the available component carriers by the first network node and the second network node, and acquire the relevant parameters of the available component carriers measured by respective network nodes.

8. The electronic apparatus according to claim 7, wherein the processing circuitry is configured to instruct the first network node and the second network node to periodically measure a certain proportion of available component carriers determined based on the basic information to acquire the relevant parameters of the available component carriers, and acquire measurement results from the second network node.

9. The electronic apparatus according to claim 1, wherein the processing circuitry is further configured to instruct the first network node and the second network node to periodically measure respective loads, and perform, based on load measurement results of the first network node and the second network node, activation or de-activation of the secondary carrier,
wherein the processing circuitry is configured to perform the activation of the secondary carrier in the case of meeting one of the following conditions: the loads of the first network node and the second network node both exceed a predetermined threshold;
the load of a particular network node among the first network node and the second network node exceeds a predetermined threshold; and the load of one of the first network node and the second network node exceeds a predetermined threshold.

10. The electronic apparatus according to claim 9, wherein the processing circuitry is further configured to generate instruction information about the activation or de-activation of the secondary carrier to inform the second network node.

11. The electronic apparatus according to claim 1, wherein the processing circuitry is further configured to generate relevant information about the primary carrier and the second carrier used in the carrier aggregation, to broadcast to other network nodes, or
wherein the processing circuitry is further configured to determine, based on broadcast information about the primary carrier and the secondary carrier used in the carrier aggregation from other network nodes, whether to perform the carrier aggregation or a specific manner of the carrier aggregation.

12. The electronic apparatus according to claim 11, wherein the relevant information is broadcasted in a format of a system information block in a physical sidelink broadcast channel, and the relevant information comprises one or more of the following: carrier frequency, carrier sequence number, synchronization information, resource pool allocation and priority level of the primary carrier and the secondary carrier.

13. The electronic apparatus according to claim 1, wherein the processing circuitry is configured to measure the relevant parameters of the available component carriers and provide measurement results to a network control node, and acquire, from the network control node, information of the primary carrier selected by the network control node based on the measurement results.

14. The electronic apparatus according to claim 13, wherein the processing circuitry is further configured to provide basic information of the network node and load measurement results to the network control node, so that the network control node determines whether to perform the carrier aggregation.

15. The electronic apparatus according to claim 1, wherein the processing circuitry is further configured to determine whether the first network node and the second network node move into a coverage range of the network control node, and in the case of positive determination, confer with the second network node on whether to transfer the relevant decision operations in the carrier aggregation to the network control node, and in the case of negative determination, continue current carrier aggregation operation,
wherein in the case that it is to transfer the relevant decision operations in the carrier aggregation to the network control node, the processing circuitry provides the basic information and the carrier usage status information of the first network node and the second network node as well as status information of current carrier aggregation to the network control node.

16. The electronic apparatus according to claim 13, wherein the electronic apparatus is used for a first network node on one side of the sidelink, and the processing circuitry is further configured to determine whether the first network node and a second network node on the other side of the sidelink move outside of a coverage range of the network control node, and in the case of positive determination, cooperate with the second network node to perform the carrier aggregation.

17. The electronic apparatus according to claim 1, wherein at least a part of the available component carriers are located in unlicensed frequency band, and the processing circuitry is configured to measure the at least a part of the available component carriers by spectrum sensing on the unlicensed frequency band, or
wherein the primary carrier and/or at least a part of the secondary carriers for the carrier aggregation are transmitted in a format of millimeter wave.

18. A method for wireless communications, comprising:
determining whether a relevant parameter of an available component carrier in a sidelink meets a predetermined condition; and
in a case of the relevant parameter meeting the predetermined condition, configuring the available component carrier to be a secondary carrier for carrier aggregation in the sidelink, wherein
the electronic apparatus is used for a first network node on one side of the sidelink,
the processing circuitry is configured to cooperate with a second network node on the other side of the sidelink to perform the carrier aggregation,
the processing circuitry is configured to share basic information of respective network nodes between the first network node and the second network node, and determine, at least based on the basic information, whether to perform the carrier aggregation, wherein the basic information includes one or more of the following:
  a type of the network node,
  a moving speed of the network node,
  a geographical location of the network node,
  capability of the network node,
  transceiving link status of the network node, and
  transceiving link occupation status, and
the processing circuitry is further configured to determine, based on the shared basic information of the network nodes, that relevant decision operations in the carrier aggregation are to be performed by the first network node, and cooperates with the second network node to achieve agreement.

19. A computer-readable storage medium comprising computer-executable instructions that, when executed by a processor, cause the method according to claim 18 to be performed.

* * * * *